(12) United States Patent
Nguyen et al.

(10) Patent No.: US 9,964,982 B1
(45) Date of Patent: May 8, 2018

(54) REMOTE POWER CONTROLLER SYSTEM AND METHOD

(71) Applicants: Dan Trong Nguyen, Lenexa, KS (US); Alan Milo Tschirner, Lenexa, KS (US)

(72) Inventors: Dan Trong Nguyen, Lenexa, KS (US); Alan Milo Tschirner, Lenexa, KS (US)

(73) Assignee: RDC, Inc., Lenexa, KS (US)

( * ) Notice: Subject to any disclaimer, the term of this patent is extended or adjusted under 35 U.S.C. 154(b) by 732 days.

(21) Appl. No.: 14/509,974

(22) Filed: Oct. 8, 2014

(51) Int. Cl.
*G06F 15/16* (2006.01)
*G05F 1/66* (2006.01)
*H04L 29/08* (2006.01)

(52) U.S. Cl.
CPC ............... *G05F 1/66* (2013.01); *H04L 67/10* (2013.01)

(58) Field of Classification Search
CPC .. H02J 3/00; H02J 13/00; G06F 1/189; G06F 1/26; G06F 1/28; G06F 1/266; G06F 1/3287; G01R 35/04; Y04S 20/327; Y04S 10/30; H02B 1/015
See application file for complete search history.

(56) References Cited

U.S. PATENT DOCUMENTS

| | | | | |
|---|---|---|---|---|
| 7,535,686 B2 * | 5/2009 | Valdes | ...................... | H02H 7/30 361/42 |
| 8,750,393 B1 * | 6/2014 | Alshinnawi | ............... | H04B 3/54 375/257 |
| 8,849,472 B2 * | 9/2014 | Pugh | ....................... | G05B 15/02 700/292 |
| 2005/0273207 A1 * | 12/2005 | Dougherty | ................ | G06F 1/12 700/292 |
| 2009/0315668 A1 * | 12/2009 | Leete | .................. | H05B 37/0272 340/3.1 |
| 2012/0316698 A1 * | 12/2012 | Daniel | .................... | G06F 1/266 700/297 |

* cited by examiner

*Primary Examiner* — Suraj Joshi
*Assistant Examiner* — Ayele Woldemariam
(74) *Attorney, Agent, or Firm* — John R. Bednarz; Polsinelli PC

(57) ABSTRACT

A system includes one or more processors to receive from a client computing device a request to setup a zone and assign at least one circuit breaker selected from a plurality of circuit breakers to the zone, receive from the client computing device a selection of a control methodology for the zone, receive from the client computing device a control request for the at least one circuit breaker, and generate a message for controlling the at least one circuit breaker, the message formatted according to the control methodology and execute at least one operation to control the at least one circuit breaker in the zone based on the control request and the message.

51 Claims, 14 Drawing Sheets

REMOTE POWER CONTROLLER SYSTEM AND METHOD

FIELD

The present disclosure relates generally to systems and methods for a remote power controller. More particularly, systems and methods provide an interface for controlling, operating, and monitoring a remote power controller having one or more circuit breaker panels with one or more circuit breakers for distributing power to one or more devices using one or more control methodologies.

BACKGROUND

Circuit breaker panels are found in a variety of settings including residential, commercial, industrial, and other settings. As an example, circuit breaker panels may be installed in auditoriums, churches, performing arts centers, schools, sports venues, theaters, amusement parks, office buildings, industrial buildings, and other locations, and may be used to control audio systems, video systems, and lighting systems, among other systems. Some venues, e.g., churches, may have an audio system and/or a lighting system that may be controlled by a variety of users having limited familiarity with how to operate the one or more systems. In this situation, the church may want an easy-to-use control mechanism for controlling and operating the one or more systems. Other venues, e.g., performing arts centers and sports venues, may have one or more audio systems, one or more video systems, and one or more lighting systems that are setup and used in a variety of different ways depending upon the event. In some situations, a performer that visits the performing arts center may have specific equipment for a particular performance. As an example, a traveling performer touring the United States may utilize specific equipment at each venue. The performing arts center may have to configure power distribution to the one or more audio systems, one or more video systems, and/or one or more lighting systems for different performers, acts, or sports teams multiple times a week, sometimes even multiple times a day. This may be a difficult, burdensome, and tedious task for employees of the performing arts center and/or members of the performer's staff.

Other factors further complicate power control. There are a variety of different control protocols used by audio systems, video systems, and lighting systems. Conventional power controllers may not simultaneously control devices operating on more than one control protocol because of control conflicts. Additionally, in some situations, due to electrical noise, lighting systems and other systems may not be combined with sound systems and other systems using a single circuit breaker panel.

Some performers may have a plurality of portable remote power controllers that are brought to each venue. As an example, a first remote power controller may be used to distribute power and control the one or more audio systems, a second remote power controller may be used to distribute power and control the one or more video systems, and a third remote power controller may be used to distribute power and control the one or more lighting systems.

Additionally, many circuit breaker panels may be hardwired to a variety of different devices making changes to distribution of power to the devices difficult. If a device is to be added to the circuit breaker panel or removed from the circuit breaker panel, the entire circuit breaker panel may have to be rewired.

It is desirable to use power distribution controller systems using different control protocols simultaneously. In addition, it is desirable to use power controller systems that are not as rigid and provide flexibility and adaptability for a variety of situations.

SUMMARY

Briefly described, and according to one embodiment, aspects of the present disclosure generally relate to methods and systems for a remote power controller. In one aspect, a system provides an interface for controlling, operating, and monitoring a remote power controller having one or more circuit breaker and/or relay panels with one or more circuit breakers and/or relays for controlling one or more devices using one or more control methodologies.

According to one embodiment, a system includes one or more processors to receive from a client computing device a request to setup a first zone and a second zone, assign at least one circuit breaker selected from a plurality of circuit breakers to the first zone, and assign at least one other circuit breaker selected from a remainder of the plurality of circuit breakers to the second zone, receive from the client computing device a selection of a first control methodology for the first zone and a second control methodology for the second zone, the second control methodology being different than the first control methodology, receive from the client computing device a control request for the at least one circuit breaker and the at least one other circuit breaker, and generate a message for controlling the at least one circuit breaker and the at least one other circuit breaker, the message formatted according to at least one of the first control methodology and the second control methodology and execute at least one operation to control the at least one circuit breaker in the first zone and the at least one other circuit breaker in the second zone based on the control request and the message.

According to a further embodiment, a method includes receiving, by one or more processors, from a client computing device a request to setup a first zone and a second zone, assigning at least one circuit breaker selected from a plurality of circuit breakers to the first zone, and assigning at least one other circuit breaker selected from a remainder of the plurality of circuit breakers to the second zone, receiving, by the one or more processors, from the client computing device a selection of a first control methodology for the first zone and a second control methodology for the second zone, the second control methodology being different than the first control methodology, receiving, by the one or more processors, from the client computing device a control request for the at least one circuit breaker and the at least one other circuit breaker, and generating, by the one or more processors, a message for controlling the at least one circuit breaker and the least one other circuit breaker, the message formatted according to at least one of the first control methodology and the second control methodology and executing at least one operation to control the at least one circuit breaker in the first zone and the at least one other circuit breaker in the second zone based on the control request and the message.

According to another embodiment, a non-transitory computer-readable medium includes instructions stored thereon that, when executed by one or more processors, cause the one or more processors to perform operations including receiving from a client computing device a request to setup a first zone and a second zone, assigning at least one circuit breaker selected from a plurality of circuit breakers to the first zone, and assigning at least one other circuit breaker selected from a remainder of the plurality of circuit breakers to the second zone, receiving from the client computing device a selection of a first control methodology for the first zone and a second control methodology for the second zone, the second control methodology being different than the first control methodology, receiving from the client computing device a control request for the at least one circuit breaker and the at least one other circuit breaker, and generating a message for controlling the at least one circuit breaker and the at least one other circuit breaker, the message formatted according to at least one of the first control methodology and the second control methodology and executing at least one operation to control the at least one circuit breaker in the first zone and the at least one other circuit breaker in the second zone based on the control request and the message.

According to an additional embodiment, a system includes one or more processors to receive from a client computing device a request to setup a zone and assign at least one circuit breaker selected from a plurality of circuit breakers to the zone, receive from the client computing device a selection of a control methodology for the zone, receive from the client computing device a control request for the at least one circuit breaker, and generate a message for controlling the at least one circuit breaker, the message formatted according to the control methodology and execute at least one operation to control the at least one circuit breaker in the zone based on the control request and the message.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein:

FIGS. 6-10 illustrate example screenshots of a user interface displayed on a display of a client computing device according to an example embodiment.

DETAILED DESCRIPTION

Figure 1:
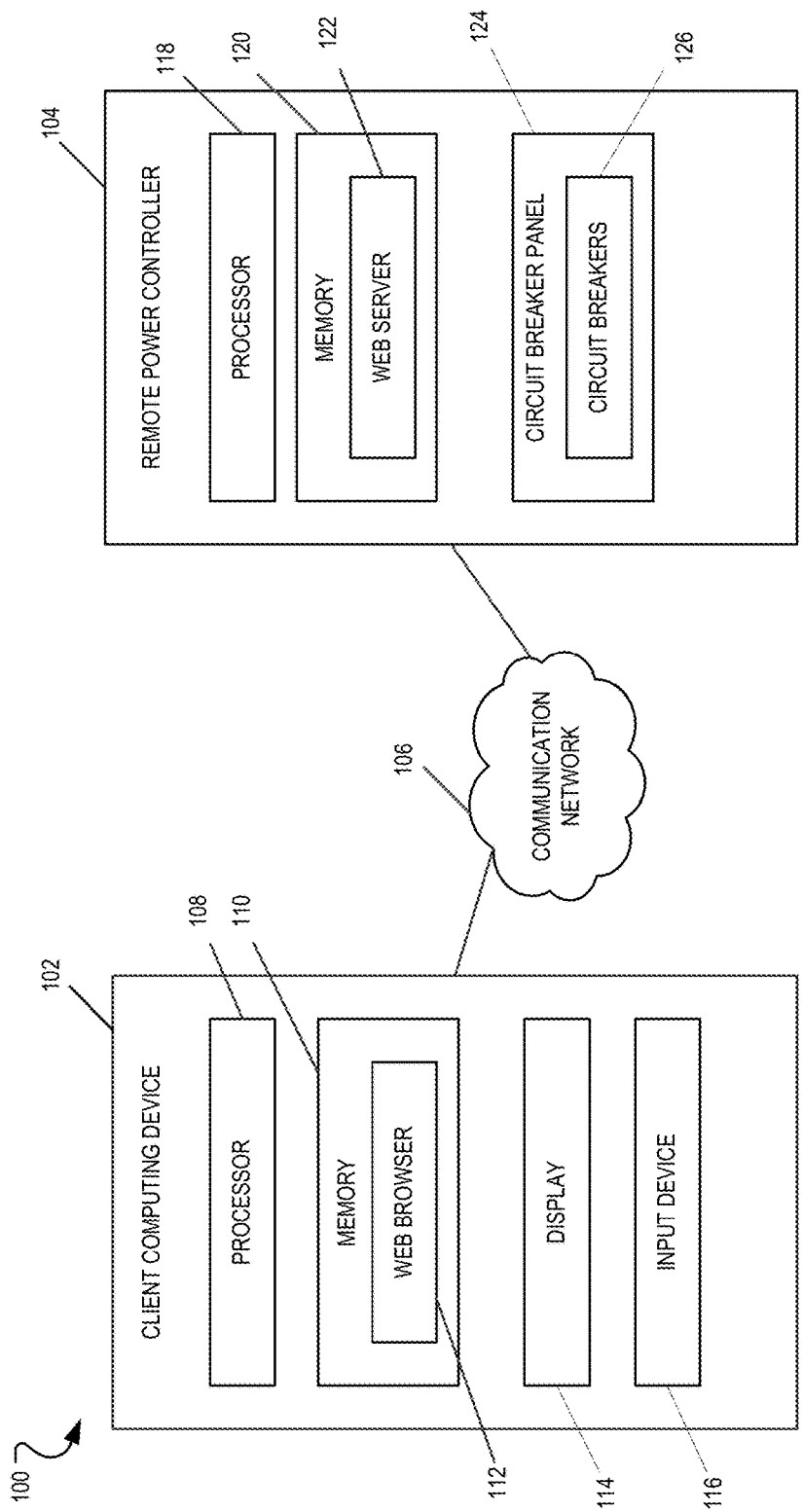
FIG. 1 illustrates a block diagram of a remote power controller system according to an example embodiment.

For the purpose of promoting an understanding of the principles of the present disclosure, reference will now be made to the embodiments illustrated in the drawings, and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates.

Conventionally, audio systems, video systems, and lighting systems using different control protocols or different control methodologies may not be controlled, operated, or monitored simultaneously using a single remote power controller (RPC). Previously, a single RPC was assigned a single control protocol or control methodology. Once a first control protocol was selected, all other control protocols would be disabled in order to avoid control conflicts.

RPC circuit breaker panels and/or relay panels (RPCR) for controlling the audio systems, video systems, and lighting systems, among other systems, may be permanently installed in a building or may be incorporated in a mobile power distribution cabinet (RPCM). As an example, the RPC or the RPCM may include one or more controllers for one or more remotely operated motorized and/or unmotorized circuit breakers. The RPCR may include one or more controllers for one or more remotely operated relays. The remotely operated circuit breaker may be a circuit breaker provided by SQUARE D® or another provider of circuit breakers. The remotely operated relay may be a relay provided by SQUARE D® or another provider of relays.

The RPC operates with one or more control methodologies including Entertainment Services and Technology Association (ESTA) DMX-512 (Digital Multiplex), sACN (Streaming Architecture for Control Networks), RS-232 (Recommended Standard-232), RS-485 (Recommended Standard-485), TCP-IP (Transmission Control Protocol/Internet Protocol), sequenced, grouped, and scheduled, among others.

As an example, lighting systems may be based on DMX or sACN and sound systems may be based on sequencing that utilize web-based controls and/or push button controls.

DMX-512 (also known as DMX or ESTA E1.11) is a standard for digital communication networks that may be used to control stage lighting and effects. However, DMX is not limited to controlling stage lighting and effects, and may be used to control nearly any device. As a result, DMX is a popular control methodology used in theatres and venues. DMX is a continuous serial data stream carried over twisted pair copper conductors conforming to RS-485 physical specifications.

sACN is also known by its standard, EIA (Electronic Industries Alliance) PLASA (Professional Lighting and Sound Association) E1.31 and is a control methodology for audio, lighting, video playback, and other systems. sACN may be layered on top of UDP/IP (user datagram protocol/internet protocol) and may utilize Ethernet and WiFi. sACN may be viewed as DMX carried as Ethernet UDP packets.

RS-232 is a standard for serial communication transmission of data that defines electrical characteristics and timing of signals, the meaning of signals, and the physical size and pinout of connectors. RS-485 is a standard for serial communication transmission of data that defines electrical characteristics and timing of signals, the meaning of signals, and the physical size and pinout of connectors. RS-485 is also known as TIA-485-A, ANSI/TIA/EIA-485, TIA/EIA-485, and EIA-485. TCP/IP provides end-to-end connectivity specifying how data should be formatted, addressed, transmitted, routed, and received at the destination. TCP/IP and related protocols are maintained by the Internet Engineering Task Force (IETF).

One or more client computing devices may communicate with the RPC using a communications network. The client computing device may display a web-based user interface to allow a user to control, monitor, and operate the one or more remotely operated circuit breakers.

The client computing device and the RPC communicate using Hypertext Transfer Protocol (HTTP) and/or other communications protocols. HTTP provides a request-response protocol in the client-server computing model. A web browser running on the client computing device may be a client and an application running on the RPC may be the server, e.g., a web server. The client submits an HTTP request to the RPC. The web server of the RPC provides resources including Hypertext Markup Language (HTML) files and other content, performs other functions on behalf of the client, and returns a response message to the client.

As an example, the RPC receives the HTTP request from the client computing device and may control, monitor, and operate the one or more circuit breakers or relays using the one or more control methodologies simultaneously. The RPC may return a response message to the web browser running on the client computing device that may visually indicate a current status of the one or more circuit breakers.

In short, a single RPC controls, monitors, and operates the one or more circuit breakers or relays that may simultaneously use different control methodologies.

FIG. 1 illustrates a block diagram of a remote power controller (RPC) system 100 according to an example embodiment. According to an aspect of the present disclosure, the RPC system 100 includes one or more client computing devices 102. The RPC system 100 further comprises one or more remote power controllers 104 having a computing device and a communication network 106. The one or more computing devices communicate and coordinate their actions by passing messages over the communication network 106. The communication network 106 can be one or more of the Internet, an intranet, a cellular communications network, a WiFi network, a packet network, or another wired or wireless communication network. As an example, the one or more computing devices communicate data in packets, messages, or other communications using a common protocol, e.g., Hypertext Transfer Protocol (HTTP) and/or Hypertext Transfer Protocol Secure (HTTPS). As an example, the RPC system 100 may be a cloud-based computer system and/or a distributed computer system.

FIG. 1 illustrates a block diagram of the client computing device 102 according to an example embodiment. The client computing device 102 may be a computer having a processor 108 and memory 110, including but not limited to a laptop, desktop, tablet computer, mobile computing device (e.g., a smartphone) or a dedicated electronic device having a processor and memory. The one or more processors 108 may process machine/computer-readable executable instructions and data, and the memory 110 may store machine/computer-readable executable instructions and data including one or more applications, including a web browser 112. The processor 108 and memory 110 are hardware. The memory 110 includes random access memory (RAM) and non-transitory memory, e.g., a non-transitory computer-readable medium such as one or more flash disks or hard drives. The non-transitory memory may include any tangible computer-readable medium including, for example, magnetic and/or optical disks, flash drives, and the like. Additionally, the memory 110 may also include a dedicated file server having one or more dedicated processors, random access memory (RAM), a Redundant Array of Inexpensive/Independent Disks (RAID) hard drive configuration, and an Ethernet interface or other communication interface, among other components.

The web browser 112 may be a component of an application and/or service executable by the client computing device 102. For example, the web browser 112 may be a single unit of deployable executable code. The web browser 112 may be one application and/or a suite of applications. As an example, the web browser 112 may be INTERNET EXPLORER®, SAFARI®, CHROME™, FIREFOX®, OPERA™, and other applications. The web browser 112 may be part of another native application executed by the client computing device 102 (e.g., a web view within the native application) and/or the web browser 112 may be a mobile web browser. According to an example embodiment, the web view may be embedded in a mobile application (e.g., an app) downloaded from a digital distribution application platform that allows users to browse and download applications developed with mobile software development kits (SDKs) including the App Store and GOOGLE PLAY® among others. The app may be installed on the client computing device 102, which may have the iOS operating system or an ANDROID™ operating system, among other operating systems. The web browser 112 communicates messages to the remote power controller 104 and receives messages from the remote power controller, e.g., HTTP requests and corresponding HTTP responses.

The client computing device 102 includes computer readable media (CRM) on which the web browser 112 is stored. The computer readable media may include volatile media, nonvolatile media, removable media, non-removable media, and/or another available medium that can be accessed by the processor 108. By way of example and not limitation, the computer readable media comprises computer storage media and communication media. Computer storage media includes non-transitory memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system.

In order to obtain access to protected resources associated with the remote power controller 104, and/or control, monitor, and operate the one or more circuit breakers powering devices that simultaneously use different control methodologies, the client computing device 102 may transmit a request including a representation of a username and a password to the remote power controller 104 using lightweight directory access protocol (LDAP), HTTP, hypertext transport protocol secure (HTTPS) and/or other protocols. The request may be a LDAP request, a representational state transfer (REST) request, a Simple Object Access Protocol (SOAP) request, or another type of request. The remote power controller 104 verifies the username and password and in response transmits a response to the client computing device 102. The remote power controller 104 may transmit an HTTP response, an HTTPS response, a LDAP response, a REST response, a SOAP response, and/or another type of response.

The username and password may be encrypted by the client computing device 102 using transport layer security (TLS), secure sockets layer (SSL) and/or other encryption protocols. The username and password may be encrypted using a cryptographic hash function (e.g., SHA-1, MD5, and others) to determine a hash-based message authentication code (HMAC) (hash-based message authentication code). In one example, "username.password" is encrypted using the cryptographic hash function. This cryptographic hash function allows the username and password to be verified and authenticated by the remote power controller 104 without directly sending the username and password to the remote power controller 104 via the communications network 106. The output of the cryptographic hash function is a binary string that may be encoded using Base64.

The client computing device 102 further includes a display 114 and an input device 116. The display 114 is used to display visual components of the web browser 112, such as at a user interface. In one example, the user interface may display a user interface of the web browser 112 and a representation of the requested resources received from the remote power controller 104. The display 114 can include a cathode-ray tube display, liquid-crystal display, a light-emitting diode display, a touch screen display, and other displays. The input device 116 is used to interact with the web browser 112 and may include a mouse, a keyboard, a trackpad, and/or the like. The input device 116 may be included within the display 114 if the display is a touch screen display. The input device 116 allows a user of the client computing device 102 to manipulate the user interface using the web browser 112.

Additionally, the client computing device 102 may include an optional sound device for providing audio output that may be associated with a notification and an optional vibration motor for providing vibration feedback that may be associated with a notification.

FIG. 1 also illustrates a block diagram of the remote power controller 104 according to an example embodiment. The remote power controller may comprise an Ethernet interface, an optional WiFi interface, control buses connected to one or more pushbuttons, a panelboard, remotely operated circuit breakers, a power supply, an optional buffer, a transducer, and a controller comprising a computing device. The remote power controller 104 includes the computing device having a processor 118 and memory 120, including but not limited to a server, laptop, desktop, tablet computer, mobile computing device (e.g., a smartphone) or a dedicated electronic device having a processor and memory. The one or more processors 118 may process machine/computer-readable executable instructions and data, and the memory 120 may store machine/computer-readable executable instructions and data including one or more applications, including a web server 112. The processor 118 and memory 120 are hardware. The memory 120 includes random access memory (RAM) and non-transitory memory, e.g., a non-transitory computer-readable medium such as one or more flash disks or hard drives. As an example, the memory 120 may be an eight gigabyte microSD (Secure Digital) memory card. The non-transitory memory may include any tangible computer-readable medium including, for example, magnetic and/or optical disks, flash drives, and the like. Additionally, the memory 120 may also include a dedicated file server having one or more dedicated processors, random access memory (RAM), a Redundant Array of Inexpensive/Independent Disks (RAID) hard drive configuration, an Ethernet interface or other communication interface, and a server-based operating system.

The web server 122 may be a software application for receiving requests for resources associated with the remote power controller 104 from one or more client computing device 102 and for responding to the requests for resources associated with the remote power controller 104. The request may be a request to control, monitor, and/or operate the one or more circuit breakers that simultaneously power devices using different control methodologies. The request may be an HTTP-based request comprising a GET request and/or a uniform resource locator (URL). As an example, the web server 122 may be stored in non-transitory memory.

The remote power controller 104 further comprises one or more circuit breaker panels 124 having one or more circuit breakers 126. A single remote power controller 104 may control one or more circuit breaker panels 124. The circuit breaker panel 124 may be a wall-mounted panel or a surface-mounted panel manufactured by LynTec and other manufacturers. As an example, the circuit breaker panel 124 may be (1) the RPC-383 panel comprising up to eighty-three positions of fifteen, twenty, or thirty ampere single, double, or triple pole motorized and/or non-motorized circuit breakers, (2) the RPC-341 panel comprising up to forty-one positions of fifteen, twenty, or thirty ampere single, double, or triple pole motorized and/or non-motorized circuit breakers, or (3) the RPC-329 panel comprising up to twenty-nine positions of fifteen, twenty, or thirty ampere single, double, or triple pole motorized and/or non-motorized circuit breakers, among others. As an example, the circuit breaker panel 124 may be 28"×86"×6" or another size, and constructed of sixteen-gauge steel. Each of the one or more circuit breakers 126 may be a remotely operated Schneider Electric ECB-G3 circuit breaker or another circuit breaker.

The circuit breaker panel 124 having the one or more circuit breakers 126 may be compatible with one or more control methodologies including DMX, RS-232 (e.g., CRESTRON® formatted control commands, and AMX® formatted control commands, among others), RS-485, sACN, TCP/IP, sequenced, grouped, and contact closures, among others. The one or more circuit breakers 126 may be controlled individually or arranged into zones. A zone comprises a group of one or more circuit breakers that is setup to power on and off a common electrical system or selected or grouped electrical system, e.g., a set of lights or equipment or group of electrical outlets. Each zone may have a particular control methodology, e.g., a first zone may have a first control methodology and a second zone may have a second control methodology different from the first control methodology. Circuit breakers arranged into zones may be, for example, toggled at 25 millisecond intervals (grouped), toggled at variable intervals (sequenced), or may be controlled based on DMX or sACN. A sequenced zone may include one or more remotely operated circuit breakers and/or one or more remotely operated relays that toggle on or off in a particular sequence at user-specified intervals. In other words, the one or more remotely operated circuit breakers and/or the one or more remotely operated relays toggle on or off in a "sequence." A grouped zone may include one or more remotely operated circuit breakers and/or one or more remotely operated relays that toggle on or off in a particular sequence at a minimal interval, e.g., 25 milliseconds. In other words, the one or more remotely operated circuit breakers and/or the one or more remotely operated relays toggle on or off in as a "group." The circuit breakers in a particular zone may be physically located in separate panels and each of the circuit breakers in the particular zone are controlled by the remote power controller according to the control methodology and one or more control methodology specific attributes for the particular zone.

Each zone may be represented by a zone data structure with one or more attributes of the zone. The zone data structure attributes may include a name of the zone, a color for the zone, an identification or representation of each of the one or more circuit breakers in the zone, a current state of the zone (e.g., enabled or disabled), the particular control methodology for the zone, and/or at least one control methodology specific attribute. Control methodology specific attributes may include, for example, delay timing between each one or the one or more circuit breakers in the zone (e.g., a grouped zone or a sequenced zone), an address or position of each of the one or more circuit breakers in the zone, an order of the one or more circuit breakers in the zone, membership information for each of the one or more circuit breakers in the zone in supergroups including the emergency off supergroup, the emergency lighting supergroup, the brown out supergroup, and the load shedding supergroup, and membership for each of the one or more circuit breakers in the zone in a time scheduled control group, among others.

The circuit breaker panel 124 may include one or more contact closure connectors compatible with external low voltage control devices including wall switches, occupancy sensors, vacancy sensors, optical sensors, light sensors, audio sensors, driveway sensors, security systems, audio sensing timers, and Internet/network-connected contact closures, among others. The contact closures may be normally open two-wire maintained toggle input, normally closed two-wire maintained toggle input, normally open two-wire momentary toggle on input, and normally closed two-wire momentary toggle off input, among others.

Figure 2:
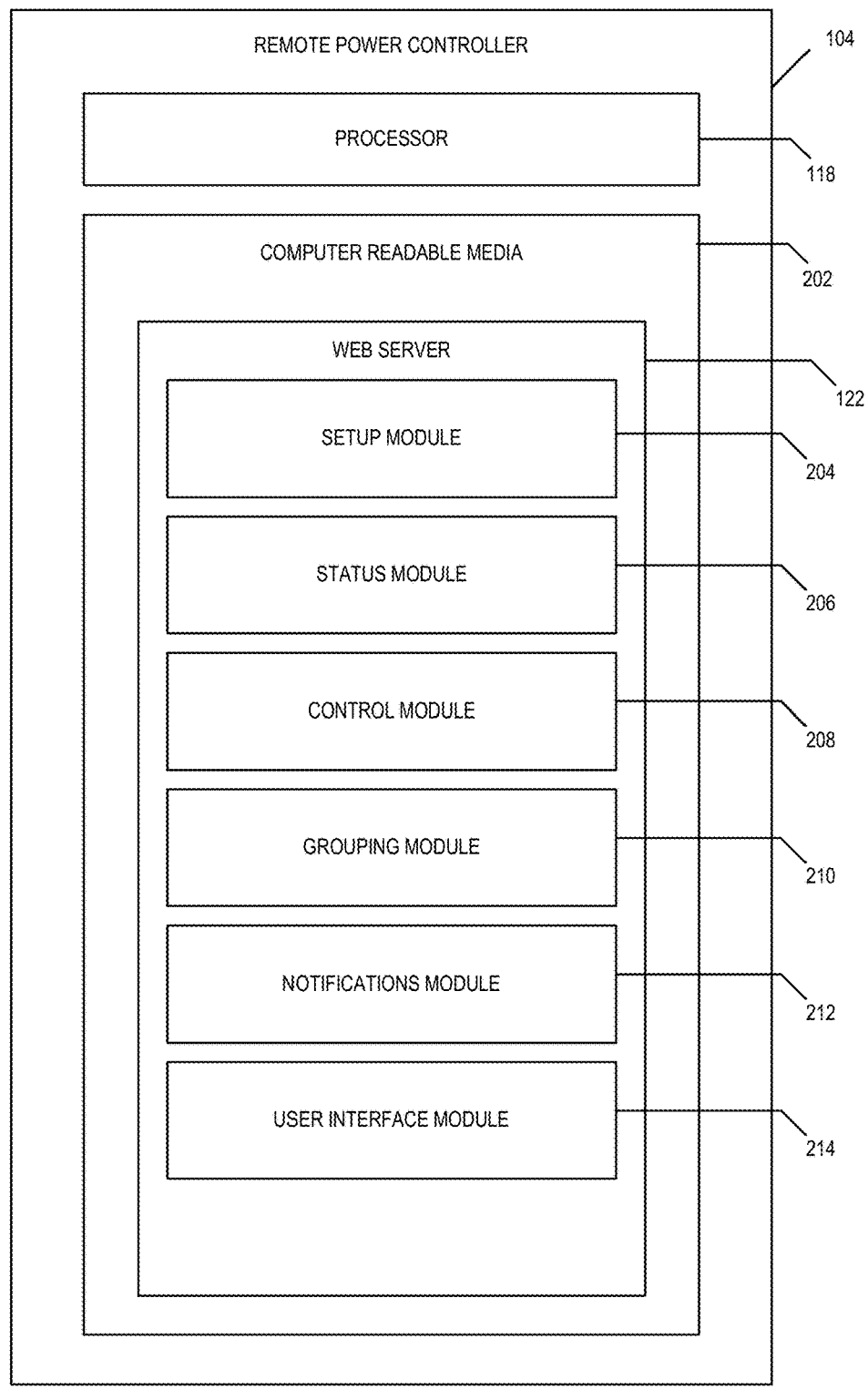
FIG. 2 illustrates a block diagram of a web server of the remote power controller according to an example embodiment.

FIG. 2 illustrates a block diagram of the web server 122 of the remote power controller 104 according to an example embodiment. As noted above, the web server 122 is executed by the processor 118. The remote power controller 104 includes computer readable media 202 on which the web server 122 is stored. The computer readable media 202 may include volatile media, nonvolatile media, removable media, non-removable media, and/or another available medium that can be accessed by the processor 118. By way of example and not limitation, the computer readable media 202 comprises computer storage media and communication media. Computer storage media includes non-transitory memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system.

In one aspect, the web server 122 comprises an embedded server onboard the remote power controller 104 for monitoring, controlling, and operating the one or more circuit breakers 126 of the one or more circuit breaker panel 124. The one or more circuit breakers 126 may simultaneously power devices using different control methodologies. The web server 122 receives messages and/or HTTP commands from one or more client computing devices 102 and transmits responses to the one or more client computing devices 102 and controls the one or more circuit breakers 126 based on the messages and/or HTTP commands. As an example, the client computing device 102 may transmit an HTTP command to the web server 122 of the remote power controller 104, e.g., GET /p2.rpc?IPB002=1, for turning on breaker number two. As another example, GET /p2.rpc?IPB002-0 comprises an HTTP command for turning off breaker number two.

As another example, the HTTP request may represent zone assignments for each circuit breaker, a circuit breaker associated with a status request, and/or a circuit breaker associated with a control request. Zone control methodologies may be represented using an integer or a hexadecimal representation, among other representations. As an example, sequenced zones may have a value of "1," grouped zones may have a value of "2," DMX zones may have a value of "3," and sACN zones may have a value of "4." In addition, breaker ranges for each zone may be represented using a string of integers or hexadecimal values, among other values. Hexadecimal may be used to efficiently represent 184 positions associated with 168 circuit breakers that may be located on four different circuit breaker panels and 16 signal relays/field-effect transistors (FET) in two IORs. As an example, zone one may be "010B." Zone one may include circuit breakers numbers 01, 02, 03, 04, 05, 16, 17, 18, 19, and 1A (in hexadecimal). Zone two may be "0B13." Zone three may be "131B." Circuit breakers may be represented using a string of integers or hexadecimal values, among other values. As an example, the circuit breaker order sequence may be represented using the following hexadecimal string: "01020304051617181919A061B071C08 1D091E0A0B0C0D1F202122." Delay times for circuit breakers may be represented using a string of integers or hexadecimal values, among other values. As an example, the delay times may be represented using the following hexadecimal string: "446444444400000000000000000000 0000000." As an example, "4" represents a delay of one second. "0" may represent a delay of 25 milliseconds.

As another example, the HTTP request may represent setup information for DMX and/or sACN zones. The setup information for DMX and/or sACN zones may be provided using binary values to enable or disable sACN universes, establish starting universe addresses for sACN universes, enable or disable DMX sets, establish starting set addresses for DMX sets, set loss of signal options for DMX, set loss of signal options for sACN, enable/disable RDM, and enable/disable RDMnet.

The web server 122 includes a setup module 204 for setting up and using the RPC 104. According to an example embodiment, the setup module 204 provides an interface and/or a menu for manipulating general settings and network settings, assigning the one or more circuit breakers 126 to a zone, creating/editing a sequence of circuit breakers in a particular zone to turn on/off, managing emergency management features, creating schedules for the one or more circuit breakers 126, and assigning contact closures, among others. The setup module 204 provides a web-based user interface for use by users of the one or more client computers 102.

The setup module 204 is used for setting up a number of parameters that may be assigned including one or more usernames and one or more associated passwords for the web server 122. As an example, a default username for the web server 122 may be "admin" and a default password for the web server 122 may be "pw." Contact information for an administrator of the remote power controller 104 may be entered using the setup module 204 including an email address and/or a telephone number that may be associated with the client computing device 102 or another device such as a cellular telephone.

Additionally, the setup module 204 may provide an interface and/or a menu for modifying a variety of network settings associated with the web server 102 including an IP address of the web server, a subnet mask, and a gateway address. The setup module 204 may be used to set a default preferred communication methodology. As an example, the setup module 204 defaults to TCP/IP, but this may be modified to another control methodology. The setup module 204 may provide an interface and/or a menu for configuring the contact closures. The interface and/or the menu for configuring the contact closures may be used to configure input/output ports on the RPC 104 and additional input/output boards. Each input may be configured to react to a momentary switch closure, continuously held open contacts, and continuously held closed contacts. Inputs may be merged to allow a pair of momentary contacts to act as separate on/off controls. The outputs may be used to drive external circuit indicators to report a status of a particular zone.

The setup module 204 further provides DMX operation options and sACN operation options. A user may modify a default first address for each DMX set and modify a default first address for each sACN universe. A DMX set may be represented by a particular zone and a sACN universe may be represented by another particular zone. In addition, a user may disable one or more DMX set and/or one or more sACN universe.

The setup module 204 also provides an interface and/or a menu associated with Remote Device Management (RDM). RDM provides identification, classification, and status information of the RDC 104 to an RDM enabled control system. RDMnet E.1.33 is a standard that adds RDM messaging on an Ethernet network. RDMnet expands the functionality of E1.31 (sACN) by providing messaging over Ethernet. The setup module 204 further provides settings for one or more contact closures including contact closures that may be connected onboard the one or more circuit breaker panels 124 IO (input output) and IOR (input output relay) modules.

The setup module 204 provides an interface and/or a menu for setting up the circuit breaker panel 124 and the circuit breakers 126 for remote operation. The setup module 204 provides an interface that allows a user to select between top/bottom panel numbering for the one or more circuit breakers 126 or left/right panel numbering for the one or more circuit breakers 126.

According to an example embodiment, each circuit breaker panel 124 may be named and each of the one or more circuit breakers 126 may be named. Each of the one or more circuit breakers 126 may be added to a zone that may be named. The zone may be a sequenced zone, a grouped zone, a DMX zone, and a sACN zone, among other types of zones. According to one aspect, each zone may have a different control methodology. A zone may contain circuit breakers in multiple circuit breaker panels 126 controlled by a single RPC. Even further, each zone may be assigned a schedule.

If the zone is a DMX zone, then an address set for the zone may be selected using a drop-down menu or another user interface element. If the zone is a sACN zone, then a universe for the zone may be selected using a drop-down menu or another user interface element.

A circuit breaker may be added to a zone by selecting a zone user interface element that represents a particular zone and selecting a corresponding circuit breaker user interface element that represents a particular circuit breaker. One or more user interface elements may, for example, be generated by the user interface module 214 below. In one aspect, a circuit breaker may be a member of one zone at a time and may not be assigned to more than one zone. If the zone is a sequenced zone, each circuit breaker assigned to the zone may be assigned a position in the sequence and/or a delay time from a dropdown selection menu. Delay time represents an amount of time between a change of state between circuit breakers in a zone. As an example, if a first circuit breaker in a sequenced zone changes state (e.g., turns on), then the circuit breaker panel may wait or pause the delay time before the second circuit breaker changes state. If there is a delay time of four seconds for the first circuit breaker, then the second circuit breaker will delay four seconds before changing state after the first circuit breaker changes state. The delay time may be minimal (25 milliseconds), 125 milliseconds, 250 milliseconds, 500 milliseconds, 1 second, 2 seconds, 4 seconds, 8 seconds, 16 seconds, 30 seconds, 2 minutes, 4 minutes, and 8 minutes, among other delay time values. If the zone is a grouped zone, circuit breakers may be automatically assigned the minimal delay time (25 milliseconds) or another value.

A circuit breaker may be added to a zone, moved from one zone to another zone, or deleted/removed from a zone using a similar process, e.g., via selection of one or more user interface elements generated by the user interface module 214 below. A circuit breaker may be moved from one zone to another zone or removed from a zone by selecting a zone user interface element and selecting a corresponding circuit breaker user interface element that indicates that the circuit breaker is a current member of a zone. As an example, if a first circuit breaker is a member of a first zone and to be moved to a second zone, the user interface may provide a modal warning popup box requesting permission to move the first circuit breaker from the first zone to the second zone. As another example, the first circuit breaker may be removed from the first zone by selecting a user interface element or "Remove" button. The user interface may provide a modal warning popup box requesting permission to remove the first circuit breaker from the first zone. When removed from the first zone, the first circuit breaker may be an unassigned circuit breaker to be assigned to another zone or remain as an unassigned circuit breaker.

As another example, the first circuit breaker may be moved to a different position in the sequence if using the sequenced control methodology or the grouped control methodology. The user interface may provide a modal popup box that provides a first user interface element or button for moving the first circuit breaker to a lower position in the sequence and a second user interface element or button for moving the first circuit breaker to a higher position in the sequence. As an example, the first user interface element or button may be an arrow pointing upward and the second user interface element or button may be an arrow pointing downward. The modal popup also may provide a drop-down box for modifying a delay time, if using the sequenced control methodology.

After the circuit breakers 126 are assigned to zones and assigned other control methodology related specific attributes including delay times among other control methodology specific attributes, a user may select a save user interface element associated with the setup module 204 to save the zone information in the zone data structure to the memory 120.

Schedules may be created using a scheduling interface associated with the setup module 204. Automatic on/off controls may be provided through the schedules. Each zone may be set to turn on and turn off according to a schedule. As an example, one or more schedules may be created and named. As an example, a first schedule may be a "Winter Schedule" having an on time of 10:15 AM Monday-Friday and an off time of 5:15 PM Monday-Friday, and an on time of 10:00 AM Saturday and Sunday and an off-time of 3:15 PM Saturday and Sunday. Other schedules may be created including a "Fall Schedule," a "Spring Schedule," and a "Summer Schedule," among others. Each zone may be assigned a schedule, if applicable. If a zone is assigned a schedule, then each circuit breaker assigned to the zone may turn on and off according to the schedule.

The web server 122 includes a status module 206 that responds to status requests from the one or more client computing devices 102. According to an example embodiment, the web browser 112 of the client computing device 102 transmits an HTTP request for the status of one or more circuit breakers 126 of the circuit breaker panel 124. The status module 206 receives the status request and transmits a web-based representation of the status of the one or more circuit breakers including status information. As an example, the status information may include a name, zone information, an address number or value including an absolute address and a zone address, a state (e.g., ON/OFF), and realtime power usage information of the one or more circuit breakers 126, among other information.

The status module 206 continually receives a message or signal from a device powered by the remote power controller 104 associated with each of the one or more circuit breakers 126. The message or signal may be formatted by the status module 206 according to a particular control methodology. The status module 206 may determine an absolute address of each of the one or more circuit breakers and determine a current zone address of each of the one or more circuit breakers. The status module 206 receives the message or signal and interprets the message or signal that is formatted according to the control methodology. The status module 206 may provide a read-only representation of the status information of the one or more circuit breakers 126 of the circuit breaker panel 124 based on the absolute address and the current zone address of each of the one or more circuit breakers. Status information may include a current state of each of the one or more circuit breakers including ON, OFF, TRIPPED, MANUAL ON, AND FAILURE.

The web server 122 includes a control module 208 that receives control requests from the one or more client computing devices 102 and controls the one or more circuit breakers 126 based on the control requests. The control request received by the control module 208 may be from a hardware push button or a software-based push button provided in a web-based user interface, among others. Thus, a control signal may originate from a command received via the communications network 106 or from a dry contact input. As noted above, a control request may be formatted as a TCP/IP request, a sACN request, or a DMX request, among others.

The control module 208 determines one or more operations associated with the control request (e.g., OFF/ON) and determines one or more circuit breakers associated with the control request. The control module 208 determines a control methodology associated with each of the one or more circuit breakers 126 and generates a message or signal formatted according to the control methodology for each of the one or more circuit breakers 126 identified in the control request. As an example, the control module 208 may receive a control request to turn on a particular circuit breaker. The control module 208 may determine an absolute address of the particular circuit breaker and determine a current zone address of the particular circuit breaker.

The control module 208 transmits the message or signal formatted according to the control methodology to a device powered by the remote power controller 104 associated with each of the one or more circuit breakers 126 identified in the control request based on the absolute address of the particular circuit breaker and the current zone address of the particular circuit breaker.

A control request may comprise a request to toggle the state of the one or more circuit breakers 126 (OFF/ON), a global request to turn on all circuit breakers by order of zone and sequence, a global request to turn off all circuit breakers by order of zone and sequence, a request to turn on all circuit breakers in a particular zone in sequence, a request to turn off all circuit breakers in the particular zone in sequence, and a request to "hurry-off" all circuit breakers without sequencing, among others.

The control request may be an "All Breakers On" request. All uncommitted circuit breakers (circuit breakers not assigned to a zone) and grouped zones' circuit breakers are "zipped" on. When circuit breakers are "zipped" on, the circuit breakers are turned on at a step rate of 25 milliseconds per column, per panel. Thus, all circuit breakers in all controlled panels may be turned from an off state to an on state in approximately 0.6 seconds. DMX and sACN zones' circuit breakers are unaffected by the "All Breakers On" request. The first circuit breakers of each sequenced zone are turned on, such as with a 750 ms spacing or other time spacing between each first circuit breaker, which prevents first circuit breakers in each sequenced zone from coming on all at once. Then, the other circuit breakers of the zones turn on one by one, following based on order and time delay.

As an example, if the control request is a global request to turn on all circuit breakers by order of zone and sequence and there a total of thirty-two assigned circuit breakers each assigned to one of four sequenced zones having an equal size of eight circuit breakers, the control module 208 may start with a first circuit breaker in a first zone with a 750 ms spacing between each first circuit breaker and continue to turn on each first circuit breaker in each zone in sequential order (e.g., 1.1, 750 ms, 2.1, 750 ms, 3.1, 750 ms, 4.1). The control module 208 turns on the first circuit breaker in the first zone, waits 750 ms and turns on the first circuit breaker in the second zone, waits 750 ms and turns on the first circuit breaker in the third zone, and waits 750 ms and turns on the first circuit breaker in the fourth zone. Then, the other circuit breakers of the zones turn on one by one, immediately following based on order and time delay. As an example, the first zone uses the following sequence: 1.1, 1.2, 1.3, 1.4, 1.5, 1.6, 1.7, 1.8. The second zone uses the following sequence: 2.1, 2.2, 2.3, 2.4, 2.5, 2.6, 2.7, 2.8, The third zone uses the following sequence: 3.1, 3.2, 3.3, 3.4, 3.5, 3.6, 3.7, 3.8. The fourth zone uses the following sequence: 4.1, 4.2, 4.3, 4.4, 4.5, 4.6, 4.7, 4.8.

The control request may be an "All Breakers Off" request. All uncommitted circuit breakers and grouped zones' circuit breakers are "zipped" off. When circuit breakers are "zipped" off, the circuit breakers are turned off at a step rate of 25 milliseconds per column, per panel. Thus, all circuit breakers in all controlled panels may be turned from an on state to an off state in approximately 0.6 seconds DMX and sACN zones' circuit breakers are unaffected by the "All Breakers Off" request. The last circuit breakers of each sequenced zone are turned off, such as with a 750 ms spacing or other time spacing between each last circuit breaker, which prevents last circuit breakers in each sequenced zone from turning off all at once. Then, the other circuit breakers of the zones turn off one by one, following based on order and time delay.

As an example, if the control request is a global request to turn off all circuit breakers by order of zone and sequence and there are a total of thirty-two assigned circuit breakers each assigned to one of four sequenced zones having an equal size of eight circuit breakers, the control module 208 may start with a last circuit breaker in a fourth zone with a 750 ms spacing between each last circuit breaker and continue to turn off each last circuit breaker in each zone in reverse sequential order, (e.g., 4.8, 750 ms, 3.8, 750 ms, 2.8, 750 ms, 1.8). The control module 208 turns off the last circuit breaker in the fourth zone, waits 750 ms and turns off the last circuit breaker in the third zone, waits 750 ms and turns off the last circuit breaker in the second zone, and waits 750 ms and turns off the last circuit breaker in the first zone. As an example, the fourth zone uses the following sequence: 4.8, 4.7, 4.6, 4.5, 4.4, 4.3, 4.2, 4.1. The third zone uses the following sequence: 3.8, 3.7, 3.6, 3.5, 3.4, 3.3, 3.2, 3.1. The second zone uses the following sequence: 2.8, 2.7, 2.6, 2.5, 2.4, 2.3, 2.2, 2.1. The fourth zone uses the following sequence: 1.8, 1.7, 1.6, 1.5, 1.4, 1.3, 1.2, 1.1.

According to an example embodiment, the client computing device 102 automatically receives a representation of detailed power usage information for the one or more circuit breakers 126 in memory 110 at a particular interval, e.g., every second. This detailed information may be provided by a branch circuit power meter (BCPM) of the remote power controller 104 using Modbus. The detailed power information may include current information, power information, energy information, and power factor per branch per phase information, among other information. As an example, with forty-two branches and three phases, at least 180 data points may be sampled per second. This detailed power usage information may be stored in transitory memory and/or a buffer for quicker retrieval or may be stored in non-transitory memory. The remote power controller 104 stores another representation of the detailed power usage information in memory 120 at another particular interval, e.g., every five minutes. This detailed power information may be stored in non-transitory memory and represented using a minimal footprint allowing years of detailed power usage information to be stored in memory 120.

As an example, if the representation of the detailed power information is stored as a six-byte file representation, the microSD card of memory 120 may store over fifty years of data. The detailed power information stored in memory 120 may be transferred to another storage using file transfer protocol (FTP) and/or may be sent via email at a particular interval, e.g., daily, weekly, monthly, etc.

The control module 208 may receive a request for detailed information associated with a particular circuit breaker. As an example, a user may obtain the detailed information associated with the particular circuit breaker by using the input device 116. The user may "hover" a cursor over the particular circuit breaker or select the particular circuit breaker by hovering over or selecting a particular graphical user interface element that represents the particular circuit breaker. The client computing device 102 transmits the request for detailed information to the control module 208. The control module 208 automatically transmits the detailed power usage information at the particular interval to the client computing device 102. The detailed information may be displayed using the display 114. The detailed information may comprise realtime power usage information of the one or more circuit breakers 126 or phases in addition to historical power usage information.

As an example, the client computing device 102 may send an HTTP request comprising GET /p2.rpc?IPB002=1 to turn on circuit breaker number two, GET /p2.rpc?IPB002-0 to turn off circuit breaker number two, GET /p2.rpc?IPZ002=1 to turn on all circuit breakers in zone two, GET /p2?IPZ002-0 to turn off all circuit breakers in zone two, GET /p2.rpc?IPE001=1 to turn event one on, and GET /p2.rpc?IPE001=0 to turn event one off.

As an example, event one may represent "All breakers on," event two may represent "All breakers off," event three may represent "Hurry off all breakers," event four may represent emergency override, event five may represent an audio timer, event six may represent a brownout, event seven may represent "DMX/sACN" activity, and event eight may represent emergency lighting. The events are not limited to these example events.

The client computing device 102 may send an HTTP request of GET /p2.rpc and this is a request for the current status of all breakers, zones, and events associated with the web server 122. The web server 102 may return "breakers=10110111111111111111" "zones=111111111011" events="1000000." This return represents that there are twenty circuit breakers associated with the remote power controller 104. All circuit breakers except for circuit breaker two and circuit breaker five are currently on. The return also represents a status for each of twelve zones associated with the remote power controller 104. All zones are on except for zone ten. The return also represents that event one is active, e.g., "All breakers On."

In one aspect, the client computing device 102 may send an HTTP request to the remote power controller 104 that comprises a request bit mask, e.g., data that represents a control request configuration bit for each of the one or more circuit breakers 126. In response, the remote power controller 104 may send a response bit mask, e.g., data that represents a current status configuration bit for each of the one or more circuit breakers 126.

Each circuit breaker may be assigned to a group using the grouping module 210 controlled using a contact closure. A group may comprise a supergroup of circuit breakers associated with emergency shutoff, a supergroup of circuit breakers associated with emergency lighting, and a supergroup of circuit breakers associated with brownout, among other groups. Each of these supergroups may be associated with a contact closure. Circuit breakers assigned to the emergency shutoff supergroup may be turned off when an emergency management system is activated. As an example, the emergency management system may be a fire detector or fire alarm unit that is in communication with the web server 122.

In one aspect, circuit breakers assigned to the emergency lighting supergroup may be turned on when the emergency management system is activated. In another aspect, circuit breakers not assigned to the emergency lighting supergroup may be turned on when the emergency management system is activated.

Circuit breakers assigned to the brownout supergroup may be turned off in the event of a brownout. Circuit breakers that are turned off in the event of the brownout may be sequenced back on when voltage has stabilized for four seconds or another value of time. A brownout may be defined based on a user-entered nominal operation voltage value. The nominal operation voltage value may be selected using a drop-down menu (100-240 VAC). Brownout thresholds may be automatically adjust for shutoff at nominal—20% and recovery at nominal—10% based on the selected nominal operation voltage value. The web server 122 of the remote power controller 104 may optionally store an event log that includes brownout history including outage information. As an example, the outage information for each brownout may include a date and a time that a brownout occurs and a date and a time that power is restored.

Based on the information entered during setup of the remote power controller 104, the notifications module 212 transmits notifications to the one or more client computing devices 102 and/or other devices including cellular telephones. According to an exemplary embodiment, the notifications module 212 transmits realtime alarm information and/or other information via email and/or text message to the email address and/or the telephone number entered by the user during setup of the remote power controller 104. As an example, the alarm information may include a notification that a particular circuit breaker has tripped and/or failed and has entered an alarm state. In another example, the realtime alarm information and/or other information may be sent via a push message to the client computing device 102 or using another messaging methodology. Upon receipt of the alarm information, the client computing device may provide optional audio feedback via the sound device and/or vibration feedback via the vibration motor.

The user interface module 214 receives requests from the one or more client computing devices 102 and transmits a representation of requested information and user interface elements to the client computing device 102 for display on the display 114. As an example, the user interface module 214 generates a web-based graphical user interface (GUI) that accepts input and provides output by generating web content that is transmitted via the communication network 106 and viewed by a user of the client computing device 102 using the web browser 112. The user interface module 214 may provide realtime automatically and dynamically refreshed information to the user of the client computing device 102 using HTML, Java, Javascript, AJAX (Asynchronous Javascript and XML), Microsoft .NET, and/or node.js, among others. The user interface module 214 may send data to the web server 122 of the remote power controller 104, and retrieve data from the web server 122 of the remote power controller 104 asynchronously without interfering with the display and behavior of the web page displayed on the client computing device 102. As an example, data may be retrieved using XMLHttpRequest objects.

Figure 3:
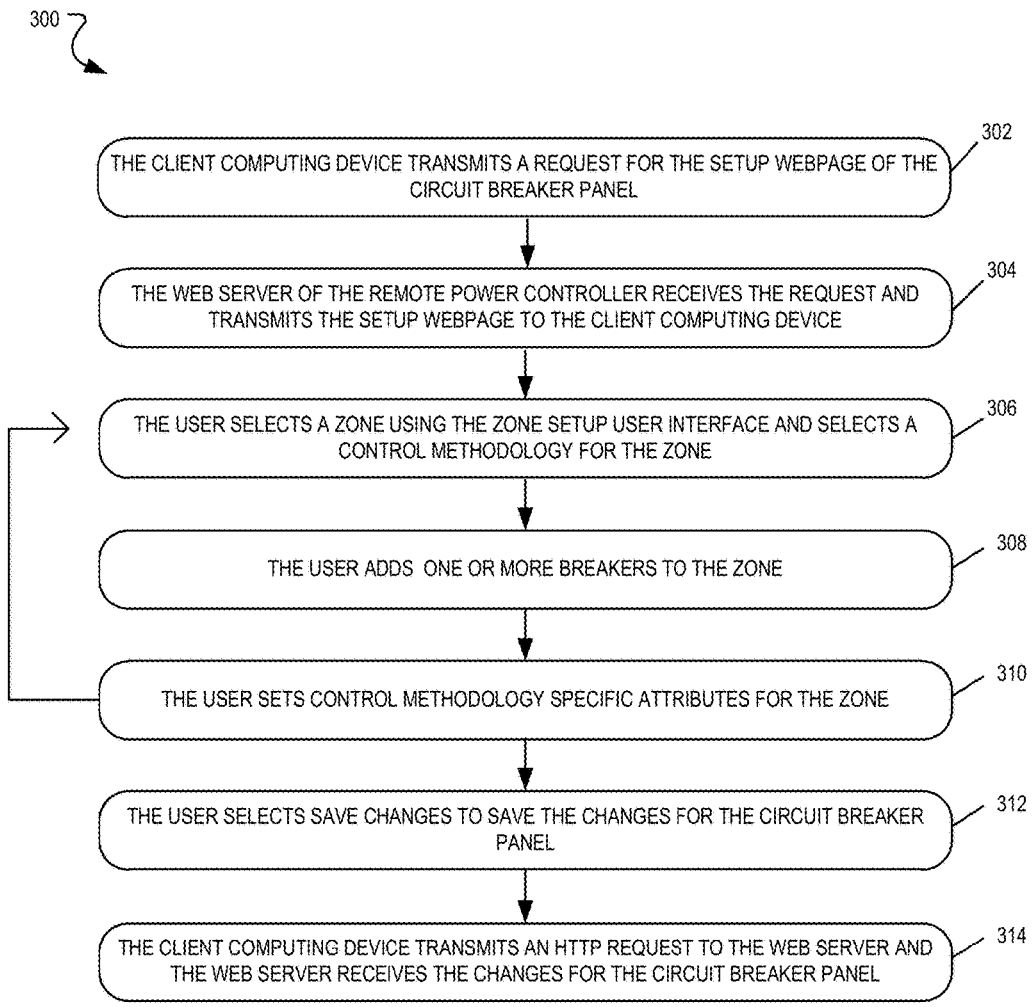
FIG. 3 illustrates a flowchart of a process for zone setup using the remote power controller according to an example embodiment.

FIG. 3 illustrates a flowchart of a process 300 for zone setup using the remote power controller 104 according to an example embodiment. The process 300 shown in FIG. 3 begins in step 302.

In step 302, the client computing device 102 transmits an HTTP request for a zone setup user interface to the web server 122 of the remote power controller 104. In step 304, the web server 122 of the remote power controller 104 receives the request and generates a web-based graphical user interface (GUI) that accepts user input and provides output by generating web content that is transmitted to the client computing device 102. As an example, this web-based user interface is a setup webpage.

According to an example embodiment, in step 306, the user selects a zone using the user interface, e.g., zone one, and selects a control methodology for the selected zone, e.g., sequenced, grouped, DMX, or sACN, among other control methodologies. According to an example embodiment, the user may first select a button, image, or other control element that represents a zone and then using a drop-down box or another graphical user interface element, select a button, image, or other control element that represents the control methodology. In step 308, the user selects one or more circuit breakers and the one or more selected circuit breakers are added to the selected zone. According to an example embodiment, the user may select a button, image, or other control element that represents each of the one or more circuit breakers to add a particular circuit breaker to a zone. For instance, the user may select a first zone button, then select a button associated with a particular circuit breaker to add the particular circuit breaker to the first zone. The user may continue to add additional circuit breakers to the zone using a similar process.

In step 310, using the user interface, the user sets control methodology specific attributes associated with the selected control methodology associated with the selected zone.

As an example, because zone one is a sequenced zone, each selected circuit breaker may be assigned an order placement number or value in the sequence of zone one. If there are six circuit breakers selected, each circuit breaker may be assigned a number from 1-6. Each of the circuit breakers may be rearranged or reordered in the sequence. In addition, for each circuit breaker, the user may select a delay time, of minimal (25 milliseconds), 125 milliseconds, 250 milliseconds, 500 milliseconds, 1 second, 2 seconds, 4 seconds, 8 seconds, 16 seconds, 30 seconds, 2 minutes, 4 minutes, and 8 minutes.

As another example, if the zone is a grouped zone, each circuit breaker may be assigned a number or value but each circuit breaker may automatically be assigned a delay time of 25 milliseconds.

If the zone is a DMX-controlled zone, the user may select an associated set for the zone. If the zone is a sACN-controlled zone, the user may select an associated universe for the zone. Other control methodology specific attributes may be selected and assigned.

As shown in FIG. 3, steps 306, 308, and 310 may be repeated to add additional zones, assign circuit breakers to zones, and set control methodology specific attributes for each zone and/or circuit breaker.

Once the user completes assigning the circuit breakers to the zones and sets control methodology specific attributes for each of the circuit breakers, the user may save the changes in step 312. After the user selects a "Save changes" user interface button or element, in step 314, the client computing device 102 transmits a save request to the web server 122. The web server 122 receives the save request and stores the changes made during zone setup and stores the zone including the assigned circuit breakers, and the control methodology specific attributes for each of the circuit breakers in the zone in memory 120.

Figure 4:
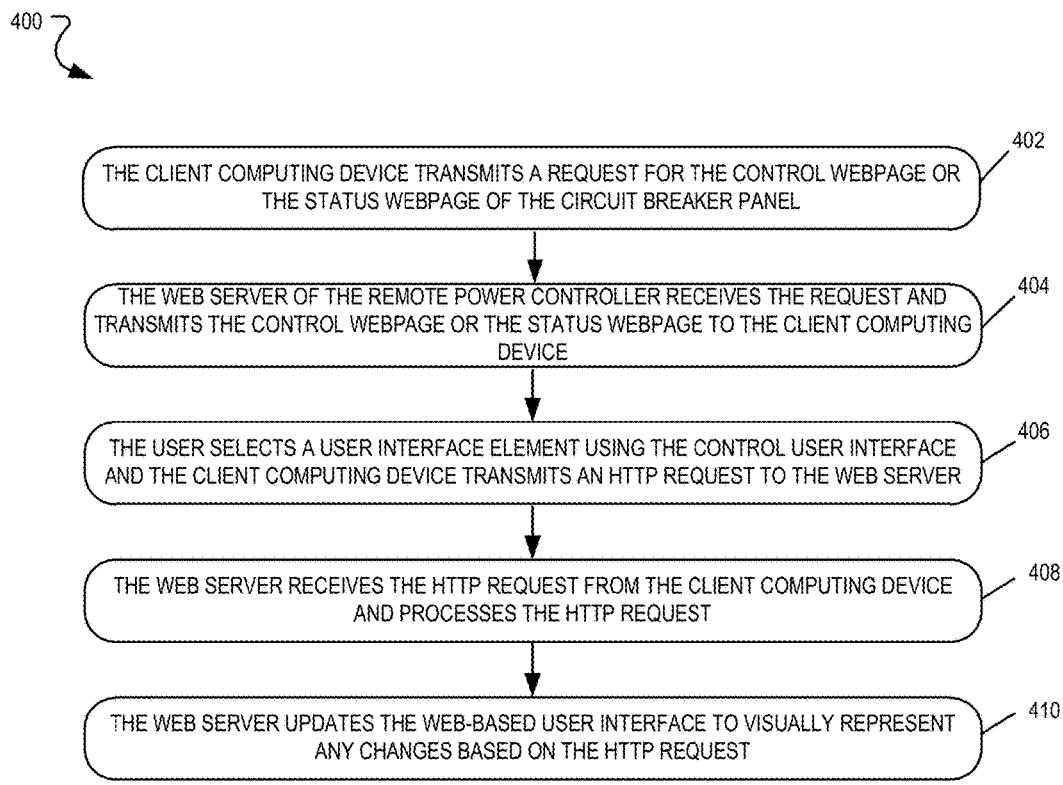
FIG. 4 illustrates a flowchart of a process for controlling, operating, and/or monitoring one or more circuit breakers using the remote power controller according to an example embodiment.

FIG. 4 illustrates a flowchart of a process 400 for controlling, monitoring, or operating the one or more circuit breakers 126 using the remote power controller 104 according to an example embodiment. The process 400 shown in FIG. 4 begins in step 402.

In step 402, the client computing device 102 transmits an HTTP request for a control user interface to the web server 122 of the remote power controller 104. In step 404, the control module 208 of the web server 122 of the remote power controller 104 receives the request and in cooperation with the user interface module 214 generates a web-based graphical user interface (GUI) that accepts user input and provides output by generating web content that is transmitted to the client computing device 102. As an example, this web-based user interface is a control webpage or a status webpage.

In step 406, the user selects a graphical user interface element, button, or image and the client computing device 102 transmits an HTTP request to the web server 122. The user interface element may represent a circuit breaker or a zone of one or more circuit breakers. According to an example, in step 406, the user selects a circuit breaker using the user interface to toggle the status of the circuit breaker, e.g., turn on breaker three on. The client computing device 102 transmits an HTTP request to the web server 122 of the remote power controller 104. As an example, the HTTP request may be GET /p2.rpc?IPB003=1. According to another example, in step 406, the user selects a first zone that represents at least one circuit breaker using the user interface. The first zone may use a first control methodology.

The HTTP request may be a request to toggle the state of the one or more circuit breakers 126 (OFF/ON), a global request to turn on all circuit breakers by order of zone and sequence, a global request to turn off all circuit breakers by order of zone and sequence, a request to turn on all circuit breakers in a particular zone in sequence, a request to turn off all circuit breakers in the particular zone in sequence, and a request to "hurry-off" all circuit breakers without sequencing, among others.

In step 408, the web server 122 of the remote power controller 104 receives the HTTP request from the client computing device 102 and processes the request. In one aspect, the web server 122 of the remote power controller 104 generates a message or signal that is formatted according to the control methodology based on the HTTP request from the client computing device 102. As an example, the web server 122 of the remote power controller generates a message or signal that is formatted according to the control methodology associated with circuit breaker three in order to toggle the status of the circuit breaker. The processor 118 of the remote power controller 104 transmits the message or signal to the device associated with circuit breaker three. The processor 118 of the remote power controller 104 turns on circuit breaker three.

In another aspect, in step 408, the web server 122 of the remote power controller 104 receives the HTTP request from the client computing device 102 to toggle the status of each circuit breaker assigned to the first zone. In this case, the web server 122 of the remote power controller 104 generates a message or signal for each circuit breaker assigned to the first zone that is formatted according to the control methodology of the first zone. The web server 122 of the remote power controller 104 transmits the message or signal to each device associated with each circuit breaker assigned to the first zone. The processor 118 of the remote power controller 104 toggles the status of each circuit breaker assigned to the first zone.

In step 410, the web server 122 of the remote power controller updates the web-based user interface that accepts user input and provides output by generating web content that visually represents any changes based on the HTTP request. As an example, after beginning the process of turning circuit breaker three on, the web server 122 of the remote power controller 104 updates the web-based user interface that accepts user input and provides output by generating web content that visually represents that circuit breaker three is on and/or is in the process of being turned on. As another example, the web content may visually represent that a zone and each circuit breaker of the zone is in the process of being turned on. This process may be based on the control methodology specific attributes.

Figure 5:
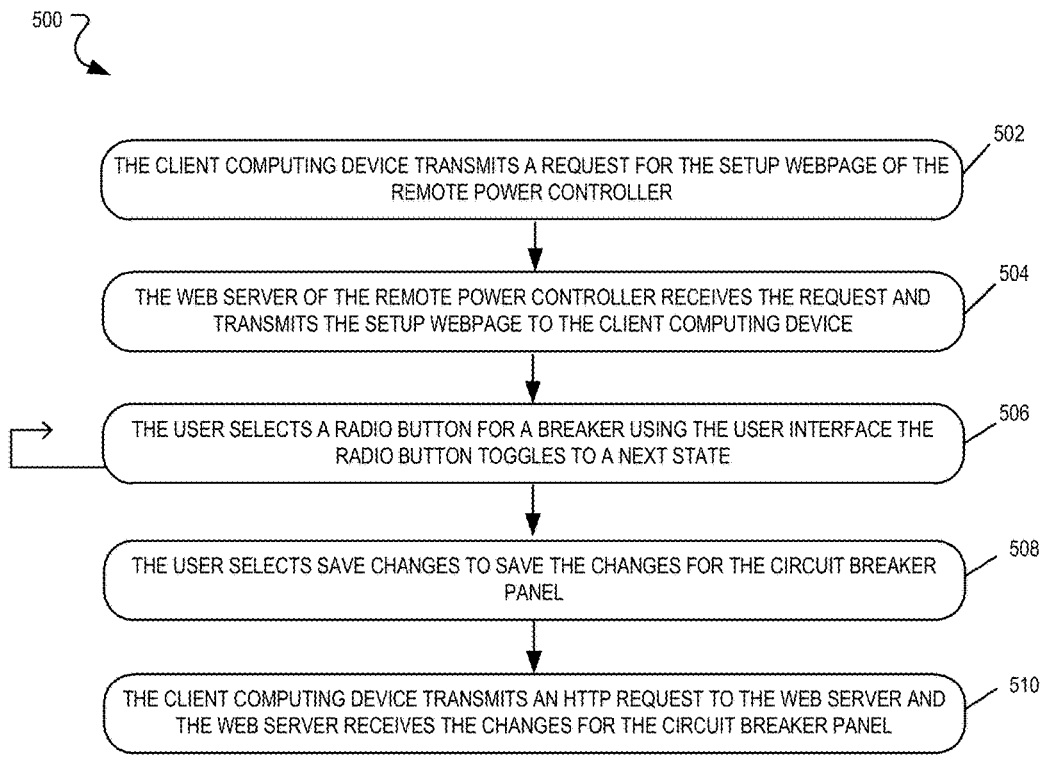
FIG. 5 illustrates a flowchart of a process for adding, editing, and/or removing one or more circuit breakers in association with a brownout supergroup, an emergency off supergroup, and/or an emergency lighting supergroup according to an example embodiment.

FIG. 5 illustrates a flowchart of a process 500 for adding, editing, or removing one or more circuit breakers 126 from a brownout supergroup, an emergency off supergroup, and an emergency lighting supergroup according to an example embodiment. The process shown in FIG. 5 begins in step 502.

In step 502, the client computing device 102 transmits an HTTP request for a supergroup setup user interface to the web server 122 of the remote power controller 104. In step 504, the grouping module 210 of the web server 122 of the remote power controller 104 receives the request and in cooperation with the user interface module 214 generates a web-based graphical user interface (GUI) that accepts user input and provides output by generating web content that is transmitted to the client computing device 102. As an example, this web-based user interface is a group setup webpage.

In step 506, the user selects a radio button or another user interface element associated with a circuit breaker using the web-based user interface that accepts user input. The user interface provides output by indicating that the state of the radio button has changed to a different state, e.g., off or on. As an example, when selected, the radio button adds the circuit breaker to a supergroup. The supergroup may be the emergency shutoff supergroup, the emergency lighting supergroup, and/or the brownout supergroup, among other supergroups.

Once the user completes assigning the circuit breakers to the supergroups the user may save the changes in step 508. After the user selects a "Save changes" user interface element, in step 510, the client computing device 102 transmits a save request to the web server 122. The grouping module 210 of the web server 122 receives the save request and stores the changes made during group setup in memory 120 and/or memory 110.

Figure 6:
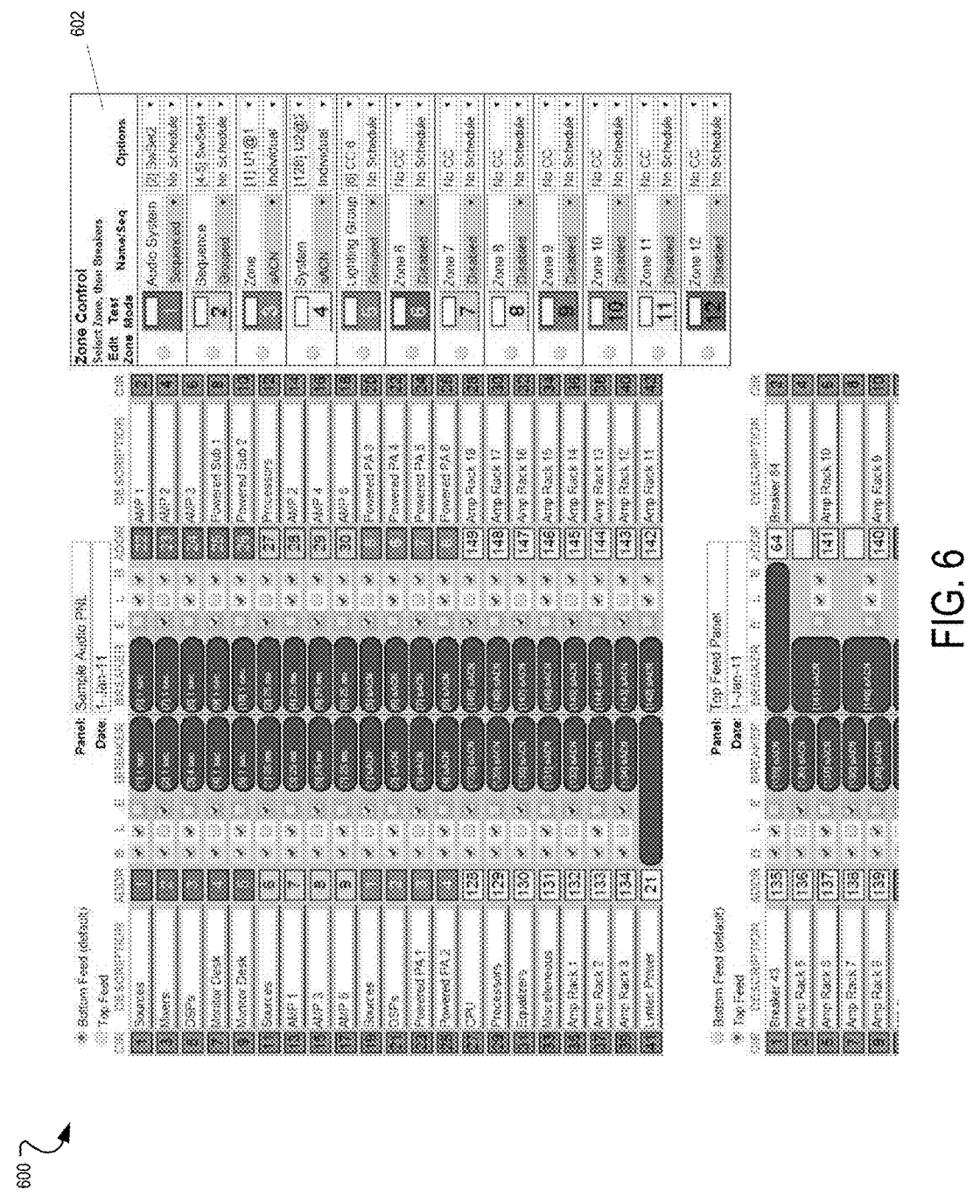

FIG. 6 shows a screenshot 600 of a user interface displayed on the display 114 and rendered by the web browser 112 of the client computing device 102 that is based on web content transmitted by the web server 122 of the remote power controller 104. The user interface shown in screenshot 600 represents a setup user interface that includes setup content that may be associated with a panel setup webpage. As shown in FIG. 6, each of the one or more circuit breakers may be assigned to a zone using the zone control menu 602. The zone control menu 602 shows twelve different zones that may be named and assigned a control methodology, e.g., sequenced, grouped, DMX, sACN, among others. Zone 1-Zone 5 are assigned. Zone 1 is a sequenced zone, zone 2 is a grouped zone, zone 3 is a sACN zone, zone 4 is a sACN zone, and zone 5 is a grouped zone. Zone 6-Zone 12 remain disabled. Each zone and its associated circuit breakers may be represented by a particular color or designation, e.g., red, green, blue, yellow, orange, purple, peach, lime, pink, mauve, light blue, and brown, among others. A first zone may have a first designation, a second zone may have a second designation, etc.

Each circuit breaker for the panel shown in FIG. 6 may be assigned a name, a zone, an address number or value indicating a particular position in a sequence in a zone, a time delay (when applicable), and membership in one or more supergroups (brownout, emergency lighting, emergency off). When a circuit breaker is assigned to a zone, that circuit breaker may be visually identified based on the color associated with its zone and by its number in sequence or address depending upon the selected control, e.g., DMX or sACN. Additionally, as shown in FIG. 6, each circuit breaker assigned to a supergroup is shown having a check in the associated checkbox. Circuit breakers in other panels associated with remote power controller 104 may also be included in zones and supergroups.

For example, the circuit breaker three is assigned to zone one. Zone one is a sequenced zone. Circuit breaker three is number two in the sequence and has a one second delay time. Additionally, circuit breaker three is a member of the brownout supergroup as indicated by the associated check and a member of the emergency off supergroup as indicated by the associated check.

Figure 7:
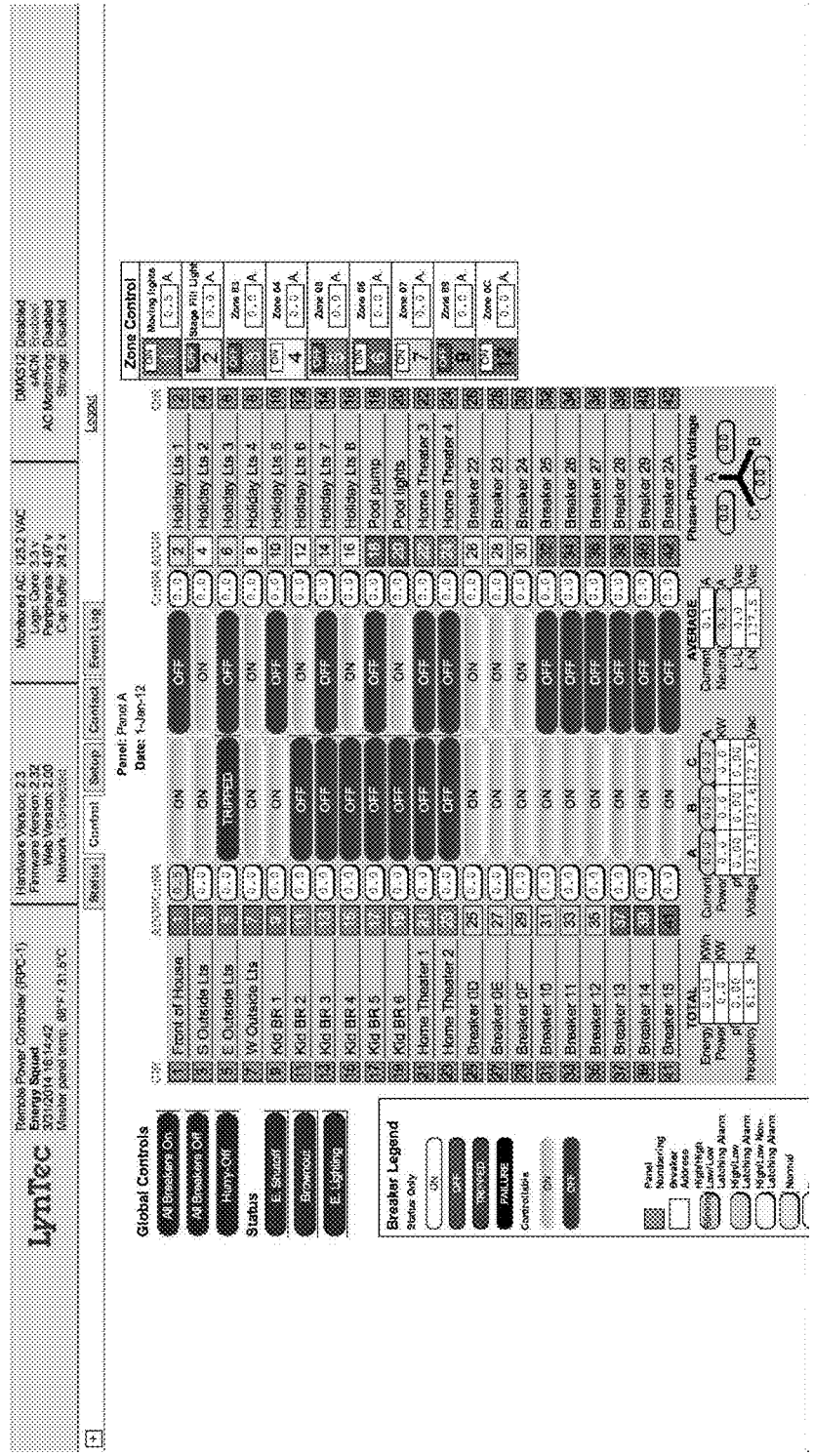

FIG. 7 illustrates another screenshot 700 of a user interface displayed on the display 114 and rendered by the web browser 112 of the client computing device 102 that is based on web content transmitted by the web server 122 of the remote power controller 104. The user interface shown in screenshot 700 represents a control user interface that includes control content that may be associated with a control webpage. As shown in FIG. 7, each of the one or more circuit breakers may be individually controlled using the user interface. When a user selects a button associated with a circuit breaker, the client computing device 102 transmits an HTTP request to the web server 122. The web server 122 receives the HTTP request, the processor 118 creates a message or signal that is formatted according to a particular control methodology, and toggles a current state of the circuit breaker, e.g., turns the circuit breaker on or off depending upon its current state. As an example, after beginning the process of turning a circuit breaker on, the web server 122 of the remote power controller 104 updates the web-based user interface that accepts user input and provides output by generating web content that visually represents that circuit breaker three is on and/or is in the process of being turned on.

As shown in the screenshot 700, when a user selects the "All Breakers On" button associated with the "Global Controls," the client computing device 102 transmits a control request to the web server 122 of the remote power controller 104. The control request is a global request to turn on all circuit breakers of the plurality of circuit breakers by order of zone and sequence. The web server 122 receives the HTTP request, the processor 118 creates a message or signal that is formatted according to each corresponding particular control methodology, and turns on each circuit breaker by order of zone and sequence. As an example, after beginning the process of turning each circuit breaker on, the web server 122 of the remote power controller 104 updates the web-based user interface that accepts user input and provides output by generating web content that visually represents that each circuit breaker is being turned on by order of zone and sequence. Each button that represents a circuit breaker may toggle from a first color representing that the circuit breaker is off, e.g., green, to another color to represent that the circuit breaker is on, e.g., grey. In addition, a label associated with the button may change from "Off" to "On." While a zone is in the process of turning on, the associated "Zone Control" button may flash. In addition, a label associated with the zone may change from "Off" to "On."

When the user selects the "All Breakers Off" button associated with the "Global Controls," the client computing device 102 transmits a control request to the web server 122 of the remote power controller 104. The control request is a global request to turn off all circuit breakers of the plurality of circuit breakers by order of zone and sequence. The web server 122 receives the HTTP request, the processor 118 creates a message or signal that is formatted according to each corresponding particular control methodology, and turns off each circuit breaker by order of zone and sequence. As an example, after beginning the process of turning each circuit breaker off, the web server 122 of the remote power controller 104 updates the web-based user interface that accepts user input and provides output by generating web content that visually represents that each circuit breaker is being turned off by order of zone and sequence. Each button that represents a circuit breaker may toggle from a first color, e.g., grey, to another color, e.g., green. In addition, a label associated with the button may change from "On" to "Off." While a zone is in the process of turning off, the associated "Zone Control" button may flash. In addition, a label associated with the zone may change from "On" to "Off."

Each of the "E. Shutoff," "Brownout," and "E. Lighting" buttons visually indicate a current status of each of the supergroups. As an example, if the "E. Shutoff" supergroup button is shown with a blue color or another color, then each of the circuit breakers associated with the "E. Shutoff" supergroup are currently on or closed. However, if the "E. Shutoff" supergroup button is shown with alternating (flashing) a grey color or another color, then each of the circuit breakers associated with the "E. Shutoff" are off or open.

Figure 8:
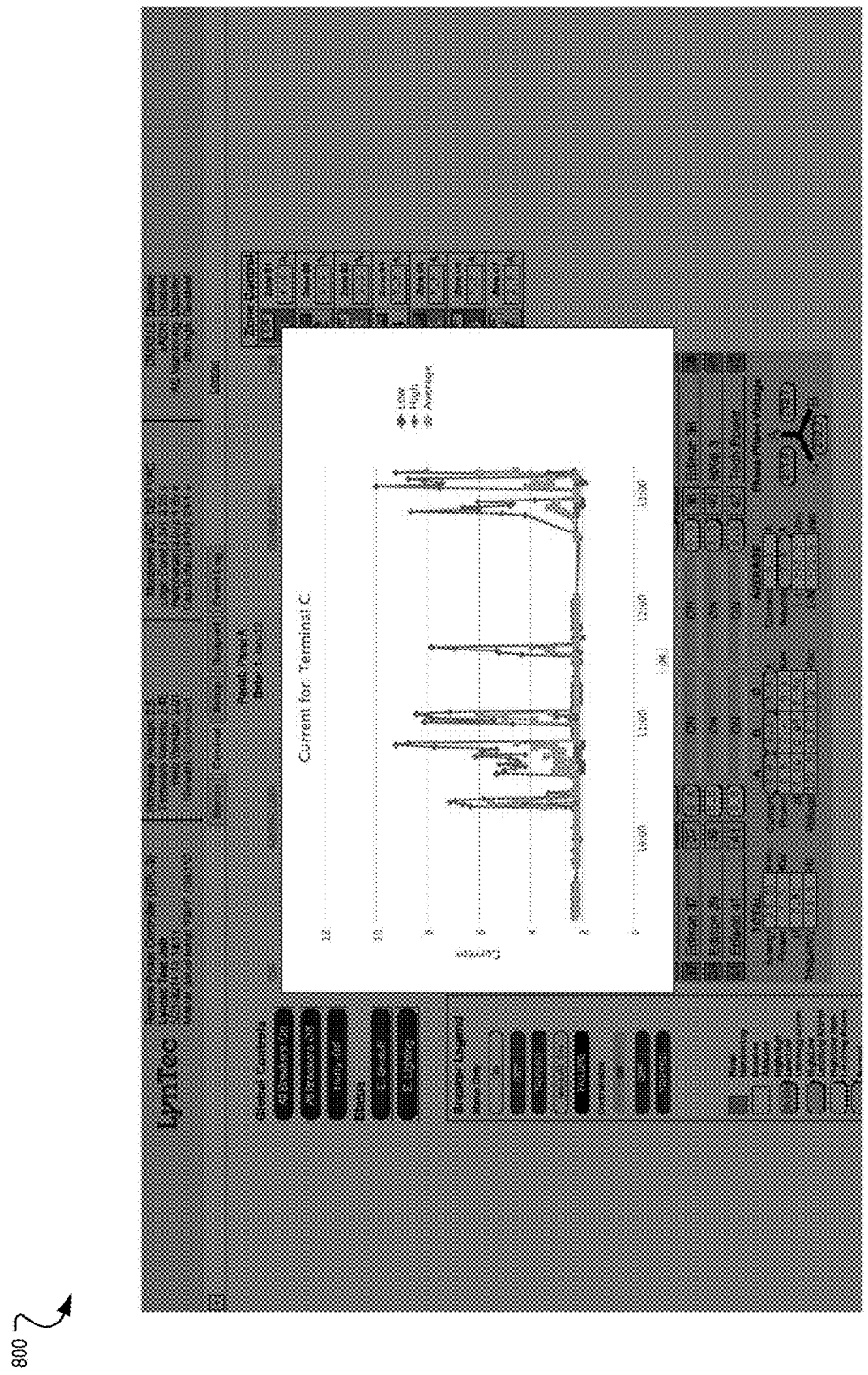

FIG. 8 illustrates another screenshot 800 of a user interface displayed on the display 114 and rendered by the web browser 112 of the client computing device 102 that is based on web content transmitted by the web server 122 of the remote power controller 104. The user interface shown in screenshot 800 represents realtime detailed information associated with a circuit breaker. The client computing device 102 transmits an HTTP request to the web server 122 for realtime detailed information, e.g., current information for the incoming electrical phase on Terminal C. The web server 122 receives the request for the realtime detailed information, and the web server 122 of the remote power controller 104 updates the web-based user interface that accepts user input and provides output by generating web content that visually represents a graph of current information for Terminal C. As shown in FIG. 8, the graph is shown via a modal overlay. The graph also may provide weekly, monthly, and yearly historical information. However, the graph is not limited to a modal overlay and may be shown in other ways.

Figure 9:
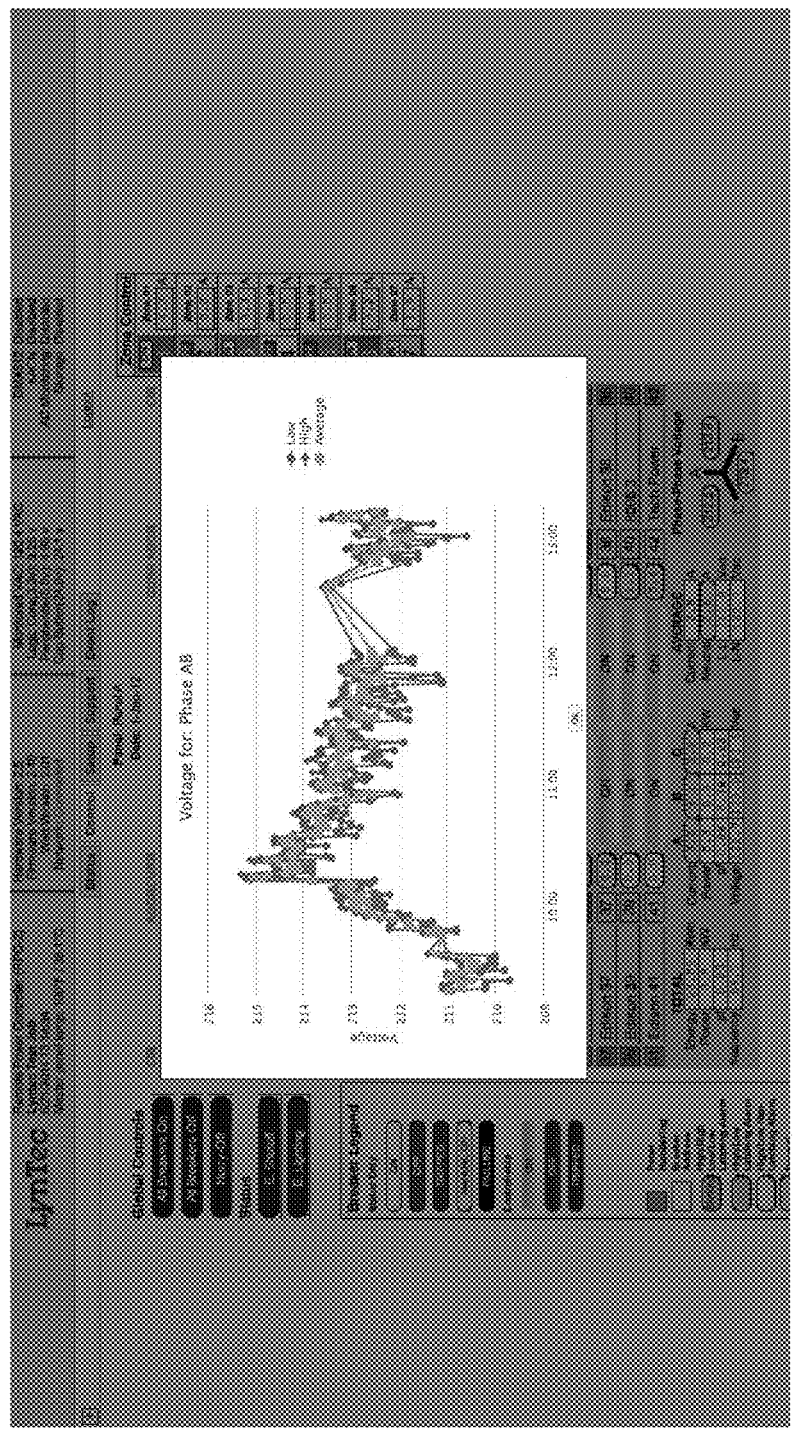

FIG. 9 illustrates another screenshot 900 of a user interface displayed on the display 114 and rendered by the web browser 112 of the client computing device 102 that is based on web content transmitted by the web server 122 of the remote power controller 104. The user interface shown in screenshot 900 represents realtime detailed information associated with a circuit breaker. The client computing device 102 transmits an HTTP request to the web server 122 for realtime detailed information, e.g., voltage potential information for Phase A to B. The web server 122 receives the request for the realtime detailed information, and the web server 122 of the remote power controller 104 updates the web-based user interface that accepts user input and provides output by generating web content that visually represents a graph of voltage information for Phase AB. The graph also may provide weekly, monthly, and yearly historical information. As shown in FIG. 9, the graph is shown via a modal overlay. However, the graph is not limited to a modal overlay and may be shown in other ways.

Figure 10:
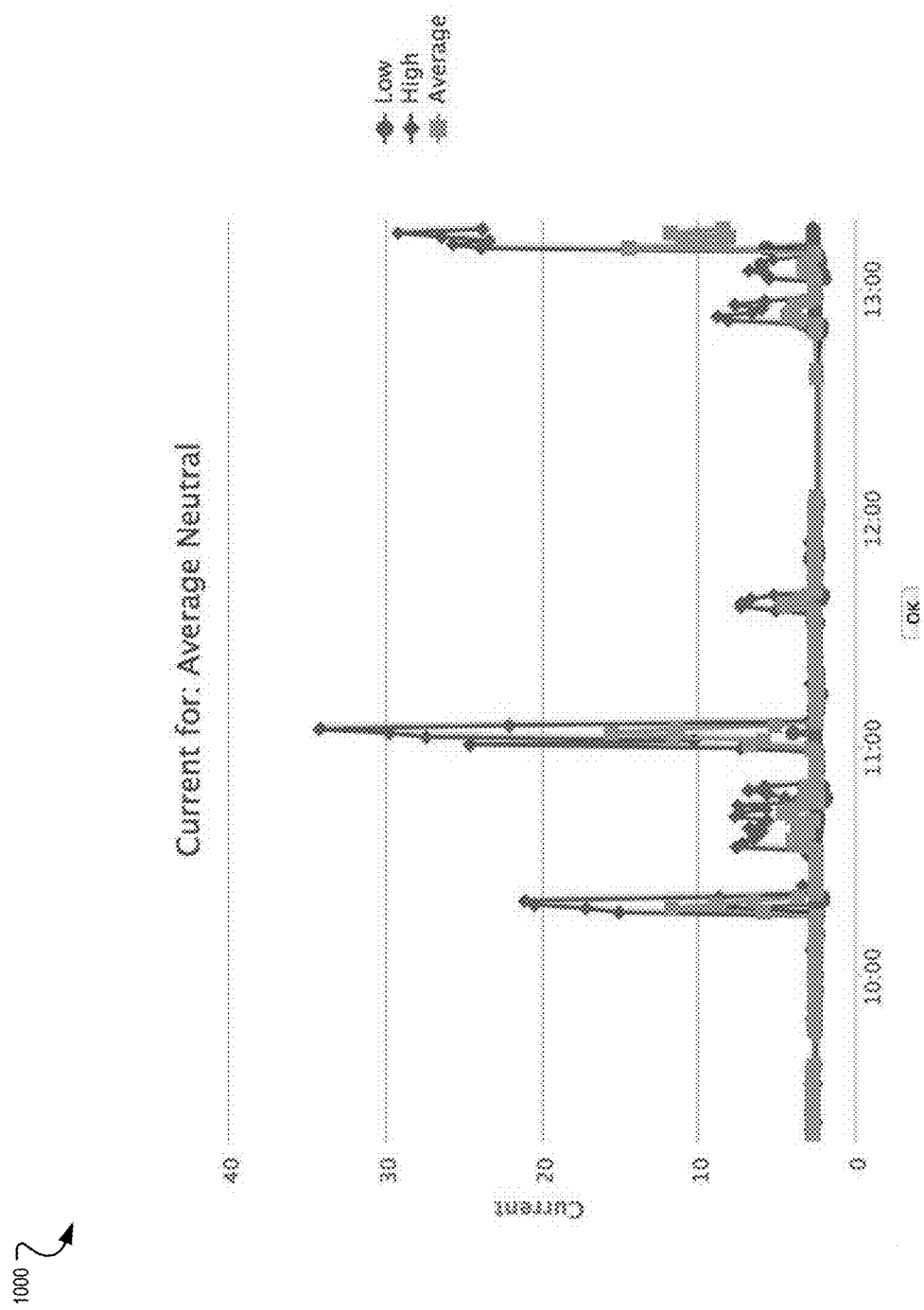

FIG. 10 illustrates another screenshot 1000 of a user interface displayed on the display 114 and rendered by the web browser 112 of the client computing device 102 that is based on web content transmitted by the web server 122 of the remote power controller 104. The user interface shown in screenshot 1000 represents realtime detailed information associated with the circuit breaker panel 124. The client computing device 102 transmits an HTTP request to the web server 122 for realtime detailed information, e.g., current information for an average neutral current of the circuit breaker panel 124. The web server 122 receives the request for the realtime detailed information, and the web server 122 of the remote power controller 104 updates the web-based user interface that accepts user input and provides output by generating web content that visually represents a graph of current information for the circuit breaker panel.

According to a further embodiment, the remote power controller 104 may provide a web application programming interface (API). The API may define HTTP request messages and the structure of response messages. The API may be a public and/or private API that provides a specification of remote calls exposed to consumer devices, e.g., client computing devices 102. The API may be a REST API and/or a SOAP API, among others. The remote power controller 104 may receive an HTTP request formatted according to the API and transmit a response that may be in an XML (Extensible Markup Language) format or JSON (Javascript Object Notation) format, among other formats.

Thus, according to an example embodiment, the remote power controller system 100 comprises an integrated web server that provides remote browser-based setup, status information, and operation for one or more circuit breakers distributing power to one or more devices that may simultaneously use one or more control methodologies. The remote power controller system 100 may be seamlessly integrated into any DMX, sACN, and/or TCP/IP control system. Power outage and brownout protection assures that circuits never power up or down incorrectly. The remote power controller system 100 provides realtime power usage data available via a web browser. In addition, the remote power controller system 100 provides easy zone setup, circuit breaker operation, and realtime status, sequencing and delay times (25 milliseconds-eight minutes), instant auto-off (load shedding), instant auto-on (egress lighting), and undervoltage auto-off. The web server 122 including its graphical user interface may be updated by storing a new version of the web server 122 in memory 120. In one example, the update may be accomplished by rewriting one or more files stored in the memory 120 associated with the web server 122.

Figure 11:
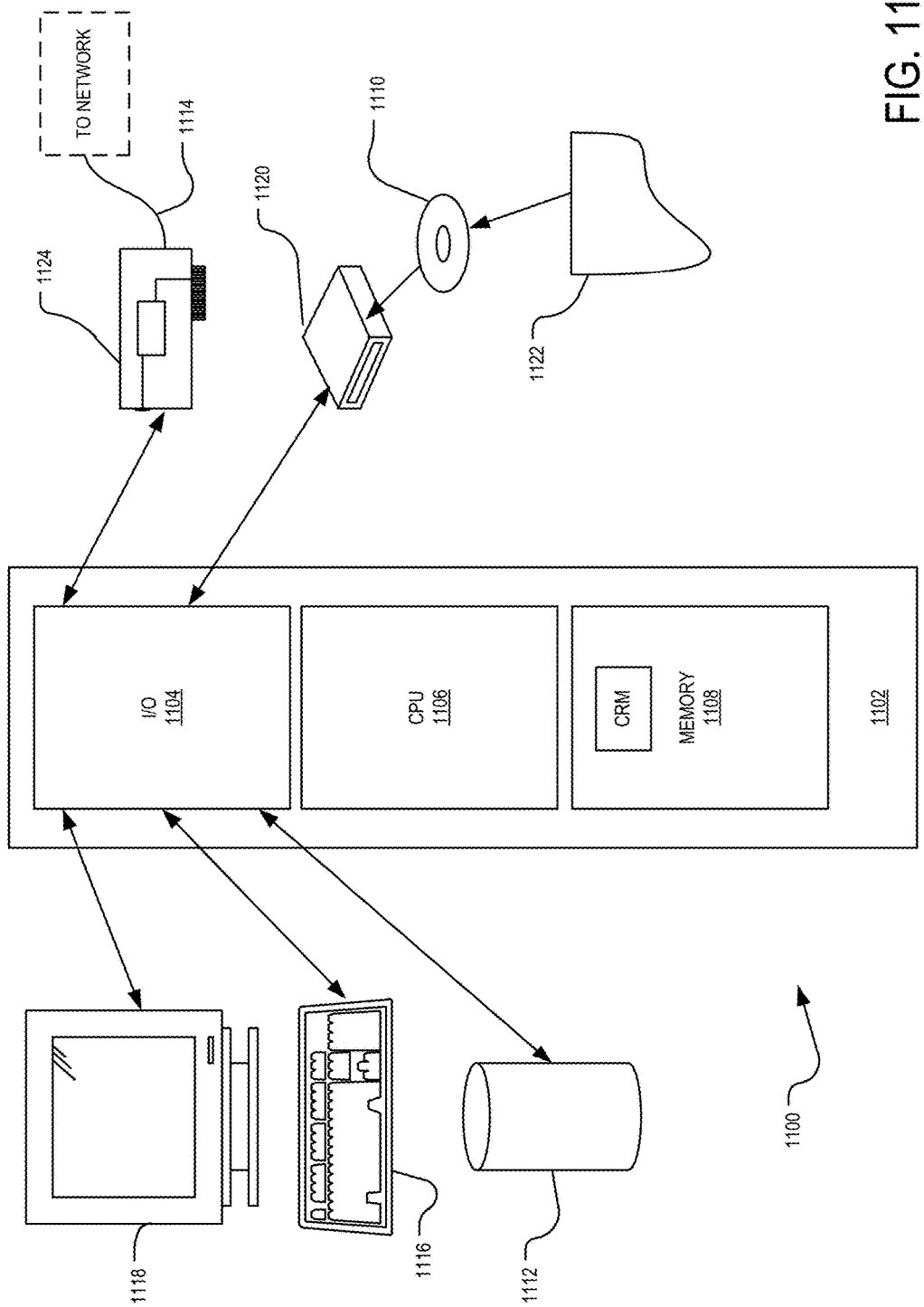
FIG. 11 illustrates a block diagram of an example computer device for use with the example embodiments.

FIG. 11 illustrates an example computing system 1100 that may implement various systems, such as the client computing device 102 and the remote power controller 104, and the methods discussed herein, such as processes 300, 400, and 500. A general purpose computer system 1100 is capable of executing a computer program product to execute a computer process. Data and program files may be input to the computer system 1100, which reads the files and executes the programs therein such as the web browser 112 and the web server 122. Some of the elements of a general purpose computer system 1100 are shown in FIG. 11 wherein a processor 1102 is shown having an input/output (I/O) section 1104, a central processing unit (CPU) 1106, and a memory section 1108. There may be one or more processors 1102, such that the processor 1102 of the computer system 1100 comprises a single central-processing unit 1106, or a plurality of processing units, commonly referred to as a parallel processing environment. The computer system 1100 may be a conventional computer, a server, a distributed computer, or any other type of computer, such as one or more external computers made available via a cloud computing architecture. The presently described technology is optionally implemented in software devices loaded in memory 1108, stored on a configured DVD/CD-ROM 1110 or storage unit 1112, and/or communicated via a wired or wireless network link 1114, thereby transforming the computer system 1100 in FIG. 11 to a special purpose machine for implementing the described operations.

The memory section 1108 may be volatile media, non-volatile media, removable media, non-removable media, and/or other media or mediums that can be accessed by a general purpose or special purpose computing device. For example, the memory section 1108 may include non-transitory computer storage media and communication media. Non-transitory computer storage media further may include volatile, nonvolatile, removable, and/or non-removable media implemented in a method or technology for the storage (and retrieval) of information, such as computer/machine-readable/executable instructions, data and data structures, engines, program modules, and/or other data. Communication media may, for example, embody computer/machine-readable/executable, data structures, program modules, algorithms, and/or other data. The communication media may also include an information delivery technology. The communication media may include wired and/or wireless connections and technologies and be used to transmit and/or receive wired and/or wireless communications.

The I/O section 1104 is connected to one or more user-interface devices (e.g., a keyboard 1116 and a display unit 1118), a disc storage unit 1112, and a disc drive unit 1120. Generally, the disc drive unit 1120 is a DVD/CD-ROM drive unit capable of reading the DVD/CD-ROM medium 1110, which typically contains programs and data 1122. Computer program products containing mechanisms to effectuate the systems and methods in accordance with the presently described technology may reside in the memory section 1104, on a disc storage unit 1112, on the DVD/CD-ROM medium 1110 of the computer system 1100, or on external storage devices made available via a cloud computing architecture with such computer program products, including one or more database management products, web server products, application server products, and/or other additional software components. Alternatively, a disc drive unit 1120 may be replaced or supplemented by a floppy drive unit, a tape drive unit, or other storage medium drive unit. The network adapter 1124 is capable of connecting the computer system 1100 to a network via the network link 1114, through which the computer system can receive instructions and data. Examples of such systems include personal computers, Intel or PowerPC-based computing systems, AMD-based computing systems and other systems running a Windows-based, a UNIX-based, or other operating system. It should be understood that computing systems may also embody devices such as Personal Digital Assistants (PDAs), mobile phones, tablets or slates, multimedia consoles, gaming consoles, set top boxes, etc.

When used in a LAN-networking environment, the computer system 1100 is connected (by wired connection and/or wirelessly) to a local network through the network interface or adapter 1124, which is one type of communications device. When used in a WAN-networking environment, the computer system 1100 typically includes a modem, a network adapter, or any other type of communications device for establishing communications over the wide area network. In a networked environment, program modules depicted relative to the computer system 1100 or portions thereof, may be stored in a remote memory storage device. It is appreciated that the network connections shown are examples of communications devices for and other means of establishing a communications link between the computers may be used.

In an example implementation, source code executed by the client computing device 102 and the remote power controller 104, a plurality of internal and external databases, source databases, and/or cached data on servers are stored in memory 110 of the client computing device 102, memory 120 of the remote power controller 104 or other storage systems, such as the disk storage unit 1112 or the DVD/CD-ROM medium 1110, and/or other external storage devices made available and accessible via a network architecture. The source code executed by the client computing device 102 and the remote power controller 104 may be embodied by instructions stored on such storage systems and executed by the processor 1102.

Some or all of the operations described herein may be performed by the processor 1102, which is hardware. Further, local computing systems, remote data sources and/or services, and other associated logic represent firmware, hardware, and/or software configured to control operations of the RPC system 100 and/or other components. Such services may be implemented using a general purpose computer and specialized software (such as a server executing service software), a special purpose computing system and specialized software (such as a mobile device or network appliance executing service software), or other computing configurations. In addition, one or more functionalities disclosed herein may be generated by the processor 1102 and a user may interact with a Graphical User Interface (GUI) using one or more user-interface devices (e.g., the keyboard 1116, the display unit 1118, and the user devices 1104) with some of the data in use directly coming from online sources and data stores. The system set forth in FIG. 11 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon executable instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic executable instructions.

Figure 12:
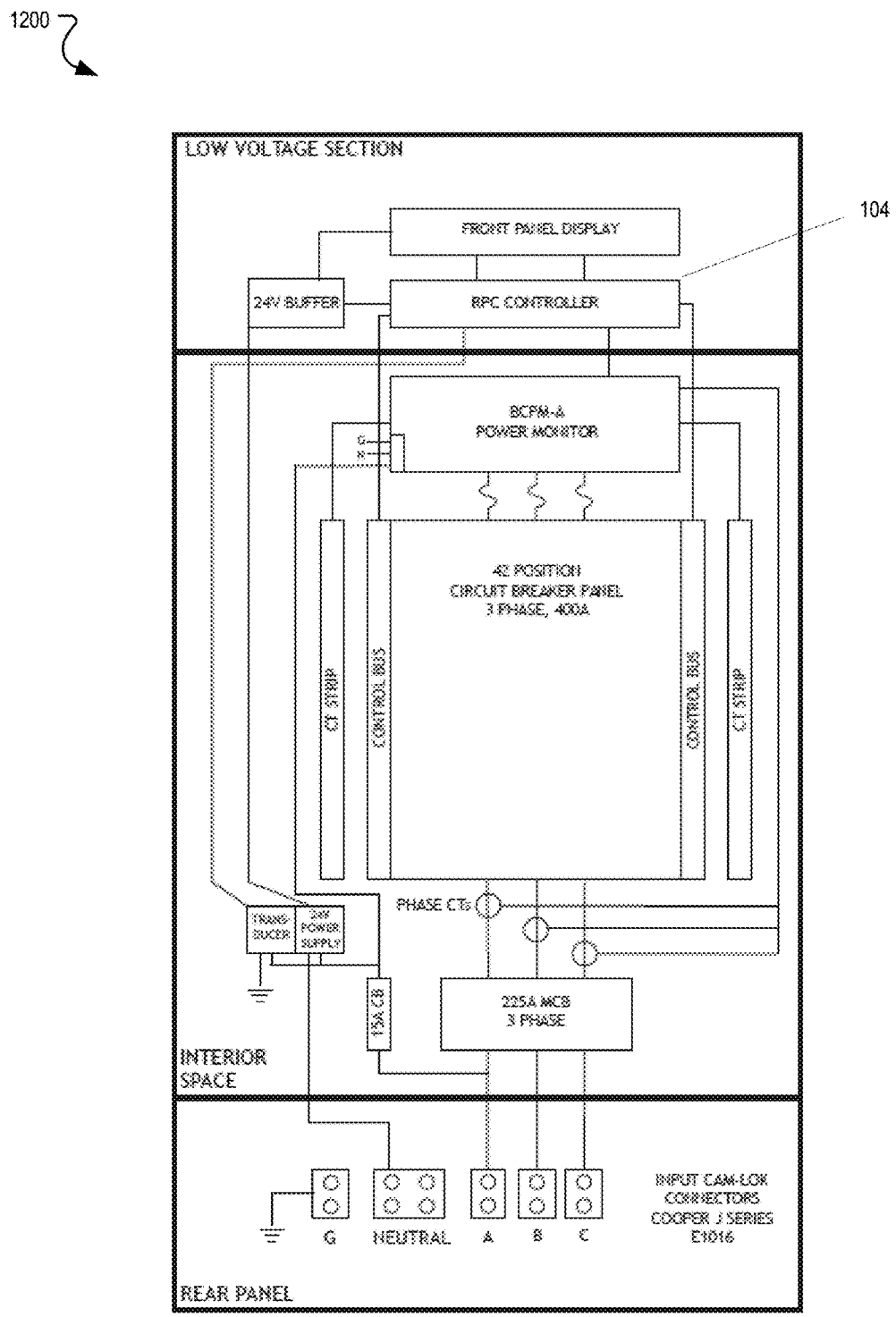
FIG. 12 illustrates another block diagram of the remote power controller system according to an example embodiment.

FIG. 12 illustrates an example RPCM block diagram 1200 according to example embodiments. The block diagram 1200 shows the RPC controller 104.

Figure 13:
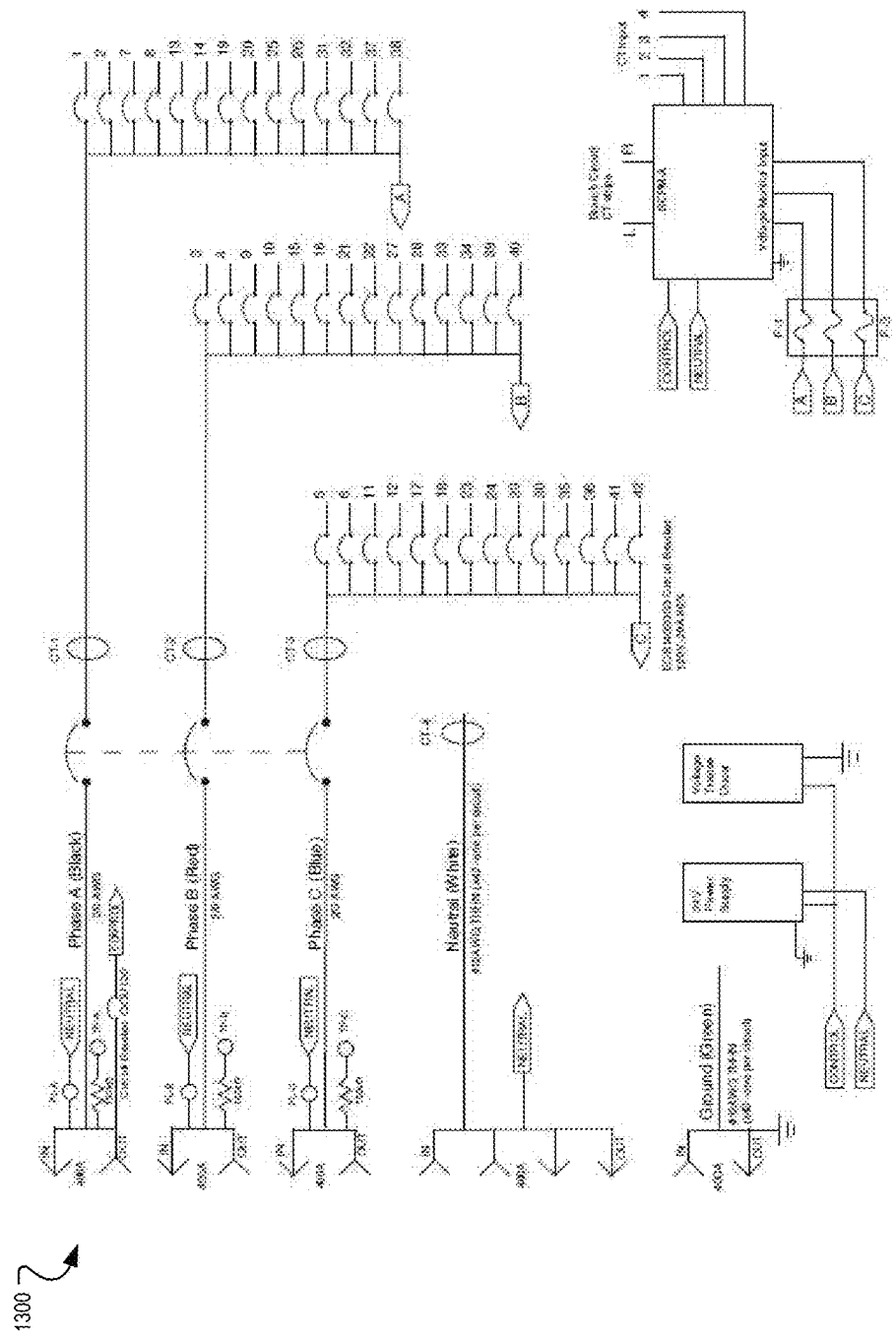
FIG. 13 illustrates an example schematic of the remote power controller system according to an example embodiment.

FIG. 13 illustrates an example RPCM schematic 1300 according to example embodiments.

Figure 14:
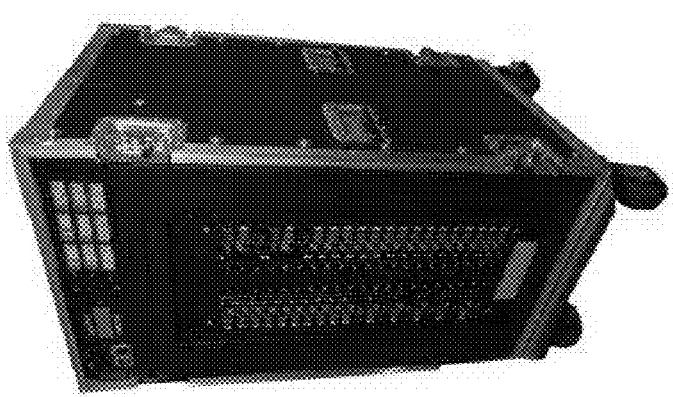
FIG. 14 illustrates a photograph of an exterior of the remote power controller system according to an example embodiment.

FIG. 14 illustrates a photograph of an exterior of the RPCM including the remote power controller 104 according to an example embodiment. As shown in FIG. 14, the remote power controller 104 may be enclosed inside a case having one or more handles. The case may be designed for carrying electronic devices and may be a wheeled case having swivel casters, locking swivel casters, or removable swivel casters for transporting the remote power controller 104. As an example, the case may be manufactured by Georgia Case Company or another case manufacturer. The case may have a plywood core and an aluminum outer surface. Additionally, the case may be double angle secured and include machine driven rustproof solid steel rivets, a heavy duty aluminum tongue and groove, recessed steel spring loaded handles, large recessed steel twist latches, steel corner clamps, and steel ball corners with heavy duty wheels. The case may have dimensions of approximately 20"×32"×36" or another size.

The remote power controller 104 may include an external display having one or more liquid crystal display (LCD) sections and one or more light emitting diodes (LEDs). This external display is dynamically refreshed and provides status information for the remote power controller 104. As an example, the status information for the remote power controller 104 may include a "heartbeat" activity indicator, transmit and receive status information for a "left bus," transmit and receive status information for a "right bus," transmit and receive information for a BCPM Modbus, microSD card status (e.g., read/write), DMX "valid" in and DMX through status information, and DMX activity status information, among other information. The external display may provide other information including pushbutton status information and zone status information (e.g., off for zone off, on for zone on). The other information also may be provided in other ways. The one or more LEDs may blink slowly when zone sequencing and the one or more LEDs may blink quickly if at least one circuit breaker in the zone is tripped or failed. The external display also may provide setup information including a current time and a current date, IP address information, transducer voltage information, port information, password information, and firmware version information. The external display also may provide voltage and current phases information from a main breaker by instantaneously converting information from the BCPM. The remote power controller 104 may receive this voltage and current information, buffer this voltage and current information, and update this information across seven-segment LCD external displays. An additional 4×20 LCD external display, when coupled with pushbuttons, may provide an additional point of control to operate zones, and change settings including enabling DHCP and protocols associated with the remote power controller 104. Error information also may be displayed on the external display.

The remote power controller 104 may include an onboard temperature monitor that may monitor the temperature of the remote power controller 104 and ensure that the remote power controller 104 is running smoothly and not overheating. The temperature monitor may monitor a temperature inside the case, the processor 118, and a power supply. In addition, the remote power controller 104 may include one or more P3-19 series connector receptacles that receive one or more nineteen pin cables (e.g., P3-19 or Socapex™), one or more standard (Edison) National Electrical Manufacturers Association (NEMA) 5-20 duplex Parallel Blade with Ground (PBG) receptacles, one or more single pole thermoplastic elastomer (TPE) 300A/400A series 16 power output connectors provided by HUBBELL® or another manufacturer (e.g., HBLMRSxx), one or more single pole TPE 300A/400A series 16 power input connectors provided by HUBBELL® or another manufacturer (e.g., HBLFRSxx), a main circuit breaker provided by SQUARE D® or another manufacturer (e.g., PowerPact 250 JGL36225), a wire system connected to the receptacles having insulated conductors provided by Encore Wire or another manufacturer, a FLEX-A-PRENE® wire to the main circuit breaker, a control circuit breaker provided by SQUARE D or another manufacturer ((e.g., QOU 120), a current transducer provided by Source Side or another manufacturer, a power supply provided by Puls or another manufacturer, an optional voltage buffer provided by Puls or another manufacturer, a voltage transducer provided by Flex-Core or another manufacturer, a Branch Circuit Power Meter (BCPM) power logic board provided by SQUARE D or another Manufacturer®, one or more current transformers, one or more branch circuit breakers 126 provided by SQUARE D® (e.g., ECB 14020G3 Powerlink ECB-G3) or another manufacturer, a fuse holder provided by Bussman or another manufacturer, one or more fuses provided by Bussman or another manufacturer, a bus bar comprising copper wiring, the controller including the processor 118, and the memory 120 comprising the web server 122. When included in a portable case, the remote power controller 104 may be used for electrical circuit protection and monitoring for activities including, but not limited to, festivals, concerts, and fairs, among others.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system, comprising: a memory having instructions stored thereon; and
    at least one processor to execute the instructions to:
        receive from a client computing device a request to setup a first zone and a second zone, assign at least one circuit breaker selected from a plurality of circuit breakers to the first zone, and assign at least one other circuit breaker selected from a remainder of the plurality of circuit breakers to the second zone;
        receive from the client computing device a selection of a first control methodology for the first zone comprising one of grouped, sequenced, DMX (Digital Multiplex), sACN (Streaming Architecture for Control Networks), and scheduled, and a second control methodology for the second zone comprising one of grouped, sequenced, DMX, sACN, and scheduled, the second control methodology being different than the first control methodology, wherein the selection of the first control methodology comprises sequenced;
        receive from the client computing device a control request for the at least one circuit breaker and the at least one other circuit breaker;
        receive from the client computing device a particular sequence for the at least one circuit breaker in the first zone;
        receive from the client computing device a selection of a delay time for each of the at least one circuit breaker in the first zone;
        generate a message for controlling the at least one circuit breaker and the at least one other circuit breaker using more than one control methodology simultaneously, the message formatted according to at least one of the first control methodology and the second control methodology and execute at least one operation to control the at least one circuit breaker in the first zone using the first control methodology and the at least one other circuit breaker in the second zone using the second control methodology simultaneously based on the control request and the message;
        receive from the client computing device a status request;
        receive a status for each device of a plurality of devices, each device of the plurality of devices associated with a particular circuit breaker of the plurality of circuit breakers, each status formatted according to one of the first control methodology and the second control methodology;
        interpret the status of each of the plurality of devices formatted according to one of the first control methodology and the second control methodology;
        visually represent the at least one circuit breaker of the first zone using a first designation and the at least one other circuit breaker of the second zone using a second designation; and
        visually represent a first zone number, the first control methodology, at least one first control methodology specific attribute of the first zone, a second zone number, the second control methodology, and at least one second control methodology specific attribute of the second zone.

2. The system of claim 1, the at least one processor further to:
    transmit the message formatted according to the one of the first control methodology and the second control methodology to a device associated with the at least one circuit breaker of the plurality of circuit breakers.

3. The system of claim 1, wherein the control request is a global request to turn on all circuit breakers of the plurality of circuit breakers assigned to a zone by order of zone and sequence.

4. The system of claim 1, wherein the control request is a global request to turn off all circuit breakers of the plurality of circuit breakers assigned to a zone by order of zone and sequence.

5. The system of claim 1, the at least one processor further to:

transmit to the client computing device resources for generating a graphical user interface comprising a setup interface;

receive from the client computing device a first name for the first zone and a first designation for the first zone;

receive from the client computing device a first selection of at the least one circuit breaker from the plurality of circuit breakers from the setup interface and add the first selection of the at least one circuit breaker to the first zone;

receive from the client computing device a first selection of at least one first control methodology specific attribute for the at least one circuit breaker in the first zone from the setup interface; and store a first zone data structure representing the first zone in a memory, the first zone data structure comprising one or more attributes comprising the first name for the first zone, the first designation for the first zone, the first selection of the at least one circuit breaker, and the at least one first control methodology specific attribute for the at least one circuit breaker.

6. The system of claim 5, the at least one processor further to: receive from the client computing device a second name for the second zone and a second designation for the second zone;

receive from the client computing device a second selection of the at least one other circuit breaker from the plurality of circuit breakers from the setup interface and add the second selection of the at least one circuit breaker to the second zone;

receive from the client computing device a second selection of at least one second control methodology specific attribute for the at least one circuit breaker in the second zone from the setup interface; and store a second zone data structure representing the second zone in the memory, the second zone data structure comprising one or more attributes comprising the second name for the second zone, the second designation for the second zone, the second selection of the at least one other circuit breaker, and the at least one second control methodology specific attribute for the at least one other circuit breaker.

7. The system of claim 1, wherein the control request comprises a request to toggle a state of the at least one circuit breaker, the at least one processor further to:
generate the request to toggle the state of the at least one circuit breaker; and visually represent the request to toggle the state of the at least one circuit breaker.

8. The system of claim 1, wherein the control request comprises a request to toggle a state of the at least one circuit breaker, the at least one processor further to:
generate the request to toggle the state of the at least one circuit breaker based on a sequence and a delay time; and
visually represent the request to toggle the state of the at least one circuit breaker based on the sequence and the delay time.

9. The system of claim 1, the at least one processor further to: receive a supergroup grouping request to include the at least one circuit breaker in a supergroup, the supergroup comprising at least one of a brownout supergroup, an emergency lighting supergroup, and an emergency off supergroup; and
add the at least one circuit breaker to the supergroup.

10. The system of claim 1, the at least one processor further to: receive a request for realtime detailed power usage information associated with the at least one circuit breaker;
receive a status of a device associated with the at least one circuit breaker formatted according to one of the first control methodology and the second control methodology;
interpret the status of the device associated with the at least one circuit breaker formatted according to one of the first control methodology and the second control methodology; and
transmit a response to the request for realtime detailed power usage information associated with the device associated with the at least one circuit breaker.

11. The system of claim 10, the at least one processor further to visually represent the detailed power usage information associated with the device associated with the at least one circuit breaker using a graph.

12. The system of claim 1, the at least one processor further to:
receive contact information for an administrator;
determine that a circuit breaker has entered an alarm state; and
transmit a message to the administrator based on the contact information, the message indicating that the circuit breaker has entered the alarm state.

13. The system of claim 1, wherein the client computing device comprises at least one of a smartphone and a tablet.

14. The system of claim 13, wherein the control request is transmitted to the system by the at least one of the smartphone and the tablet using hypertext transfer protocol (HTTP) by a mobile application.

15. The system of claim 1, wherein the control request comprises an HTTP request.

16. The system of claim 15, the at least one processor further to transmit to the client computing device an HTTP response comprising a visual representation of a current status of the plurality of circuit breakers.

17. The system of claim 16, wherein the current status of each of the plurality of circuit breakers comprises one of ON, OFF, TRIPPED, MANUAL ON, and FAILURE.

18. A method, comprising:
receiving, by at least one processor, from a client computing device a request to setup a first zone and a second zone, assigning at least one circuit breaker selected from a plurality of circuit breakers to the first zone, and assigning at least other one circuit breaker selected from a remainder of the plurality of circuit breakers to the second zone;
receiving, by the at least one processor, from the client computing device a selection of a first control methodology for the first zone comprising one of grouped, sequenced, DMX (Digital Multiplex), sACN (Streaming Architecture for Control Networks), and scheduled, and a second control methodology for the second zone comprising one of grouped, sequenced, DMX, sACN, a scheduled, the second control methodology being different than the first control methodology, wherein the selection of the first control methodology comprises sequenced;
receiving, by the at least one processor, from the client computing device a control request for the at least one circuit breaker and the at least one other circuit breaker;
receiving, by the at least one processor, from the client computing device a particular sequence for the at least one circuit breaker in the first zone;

receiving, by the at least one processor, from the client computing device a selection of a delay time for each of the at least one circuit breaker in the first zone;

generating, by the at least one processor, a message for controlling the at least one circuit breaker and the at least one other circuit breaker using more than one control methodology simultaneously, the message formatted according to at least one of the first control methodology and the second control methodology and executing at least one operation to control the at least one circuit breaker in the first zone using the first control methodology and the at least one other circuit breaker in the second zone using the second control methodology simultaneously based on the control request and the message;

receiving, by the at least one processor, from the client computing device a status request;

receiving, by the at least one processor, a status for each device of a plurality of devices, each device of the plurality of devices associated with a particular circuit breaker of the plurality of circuit breakers, each status formatted according to one of the first control methodology and the second control methodology;

interpreting, by the at least one processor, the status of each of the plurality of devices formatted according to one of the first control methodology and the second control methodology;

visually representing, by the at least one processor, the at least one circuit breaker of the first zone using a first designation and the at least one other circuit breaker of the second zone using a second designation; and visually representing, by the at least one processor, a first zone number, the first control methodology, at least one first control methodology specific attribute of the first zone, a second zone number, the second control methodology, and at least one second control methodology specific attribute of the second zone.

19. The method of claim 18, further comprising:

transmitting the message formatted according to the one of the first control methodology and the second control methodology to a device associated with the at least one circuit breaker of the plurality of circuit breakers.

20. The method of claim 18, wherein the control request is a global request to turn on all circuit breakers of the plurality of circuit breakers assigned to a zone by order of zone and sequence.

21. The method of claim 18, wherein the control request is a global request to turn off all circuit breakers of the plurality of circuit breakers assigned to a zone by order of zone and sequence.

22. The method of claim 18, further comprising:

transmitting to the client computing device resources for generating a graphical user interface comprising a setup interface;

receiving from the client computing device a first name for the first zone and a first designation for the first zone;

receiving from the client computing device a first selection of the at least one circuit breaker from the plurality of circuit breakers from the setup interface and adding the first selection of the at least one circuit breaker to the first zone;

receiving from the client computing device a first selection of at least one first control methodology specific attribute for the at least one circuit breaker in the first zone from the setup interface; and storing a first zone data structure representing the first zone in a memory, the first zone data structure comprising one or more attributes comprising the first name for the first zone, the first designation for the first zone, the first selection of the at least one circuit breaker, and the at least one first control methodology specific attribute for the at least one circuit breaker.

23. The method of claim 22, further comprising:

receiving from the client computing device a second name for the second zone and a second designation for the second zone;

receiving from the client computing device a second selection of at least one other circuit breaker from the plurality of circuit breakers from the setup interface and adding the second selection of the at least one circuit breaker to the second zone;

receiving from the client computing device a second selection of at least one second control methodology specific attribute for the at least one circuit breaker in the second zone from the setup interface; and storing a second zone data structure representing the second zone in the memory, the second zone data structure comprising one or more attributes comprising the second name for the second zone, the second designation for the second zone, the second selection of the at least one other circuit breaker, and the at least one second control methodology specific attribute for the at least one other circuit breaker.

24. The method of claim 18, wherein the control request comprises a request to toggle a state of the at least one circuit breaker, the method further comprising:

generating the request to toggle the state of the at least one circuit breaker; and visually representing the request to toggle the state of the at least one circuit breaker.

25. The method of claim 18, wherein the control request comprises a request to toggle a state of the at least one circuit breaker, the method further comprising:

generating the request to toggle the state of the at least one circuit breaker based on a sequence and a delay time; and visually representing the request to toggle the state of the at least one circuit breaker based on the sequence and the delay time.

26. The method of claim 18, further comprising:

receiving a supergroup grouping request to include the at least one circuit breaker in a supergroup, the supergroup comprising at least one of a brownout supergroup, an emergency lighting supergroup, and an emergency off supergroup; and adding the at least one circuit breaker to the supergroup.

27. The method of claim 18, further comprising:

receiving a request for realtime detailed power usage information associated with the at least one circuit breaker;

receiving a status of a device associated with the at least one circuit breaker formatted according to one of the first control methodology and the second control methodology;

interpreting the status of the device associated with the at least one circuit breaker formatted according to one of the first control methodology and the second control methodology; and transmitting a response to the request for realtime detailed power usage information associated with the device associated with the at least one circuit breaker.

28. The method of claim 27, further comprising visually representing the detailed power usage information associated with the device associated with the at least one circuit breaker using a graph.

29. The method of claim 18, further comprising:
receiving contact information for an administrator;
determining that a circuit breaker has entered an alarm state; and
transmitting a message to the administrator based on the contact information, the message indicating that the circuit breaker has entered the alarm state.

30. The method of claim 18, wherein the client computing device comprises at least one of a smartphone and a tablet.

31. The method of claim 30, wherein the control request is transmitted to the system by the at least one of the smartphone and the tablet using hypertext transfer protocol (HTTP) by a mobile application.

32. The method of claim 18, wherein the control request comprises an HTTP request.

33. The method of claim 32, further comprising transmitting to the client computing device an HTTP response comprising a visual representation of a current status of the plurality of circuit breakers.

34. The method of claim 33, wherein the current status of each of the plurality of circuit breakers comprises one of ON, OFF, TRIPPED, MANUAL ON, and FAILURE.

35. A non-transitory computer-readable medium having instructions stored thereon that, when executed by at least one processor, cause the at least one processor to perform operations comprising:
receiving from a client computing device a request to setup a first zone and a second zone, assigning at least one circuit breaker selected from a plurality of circuit breakers to the first zone and assigning at least one other circuit breaker selected from a remainder of the plurality of circuit breakers to the second zone;
receiving from the client computing device a selection of a first control methodology for the first zone comprising one of grouped, sequenced, DMX (Digital Multiplex), sACN (Streaming Architecture for Control Networks), and scheduled, and a second control methodology for the second zone comprising one of grouped, sequenced, DMX, sACN, and scheduled, the second control methodology being different than the first control methodology, wherein the selection of the first control methodology comprises sequenced;
receiving from the client computing device a control request for the at least one circuit breaker and the at least one other circuit breaker;
receiving from the client computing device a particular sequence for the at least one circuit breaker in the first zone;
receiving from the client computing device a selection of a delay time for each of the at least one circuit breaker in the first zone;
generating a message for controlling the at least one circuit breaker and the at least one other circuit breaker using more than one control methodology simultaneously, the message formatted according to at least one of the first control methodology and the second control methodology and executing at least one operation to control the at least one circuit breaker in the first zone using the first control methodology and the at least one other circuit breaker in the second zone using the second control methodology simultaneously based on the control request and the message;
receiving from the client computing device a status request:
receiving a status for each device of a plurality of devices, each device of the plurality of devices associated with a particular circuit breaker of the plurality of circuit breakers, each status formatted according to one of the first control methodology and the second control methodology;
interpreting the status of each of the plurality of devices formatted according to one of the first control methodology and the second control methodology;
visually representing the at least one circuit breaker of the first zone using a first designation and the at least one other circuit breaker of the second zone using a second designation; and
visually representing a first zone number, the first control methodology, at least one first control methodology specific attribute of the first zone, a second zone number, the second control methodology, and at least one second control methodology specific attribute of the second zone.

36. The non-transitory computer-readable medium of claim 35, the operations further comprising:
transmitting the message formatted according to the one of the first control methodology and the second control methodology to a device associated with the at least one circuit breaker of the plurality of circuit breakers.

37. The non-transitory computer-readable medium of claim 35, wherein the control request is a global request to turn on all circuit breakers of the plurality of circuit breakers assigned to a zone by order of zone and sequence.

38. The non-transitory computer-readable medium of claim 35, wherein the control request is a global request to turn off all circuit breakers of the plurality of circuit breakers assigned to a zone by order of zone and sequence.

39. The non-transitory computer-readable medium of claim 35, the operations further comprising:
transmitting to the client computing device resources for generating a graphical user interface comprising a setup interface;
receiving from the client computing device a first name for the first zone and a first designation for the first zone;
receiving from the client computing device a first selection of the at least one circuit breaker from the plurality of circuit breakers from the setup interface and adding the first selection of the at least one circuit breaker to the first zone;
receiving from the client computing device a first selection of at least one first control methodology specific attribute for the at least one circuit breaker in the first zone from the setup interface; and
storing a first zone data structure representing the first zone in a memory, the first zone data structure comprising one or more attributes comprising the first name for the first zone, the first designation for the first zone, the first selection of the at least one circuit breaker, and the at least one first control methodology specific attribute for the at least one circuit breaker.

40. The non-transitory computer-readable medium of claim 39, the operations further comprising:
receiving from the client computing device a second name for the second zone and a second designation for the second zone;
receiving from the client computing device a second selection of the at least one other circuit breaker from the plurality of circuit breakers from the setup interface and adding the second selection of the at least one circuit breaker to the second zone;

receiving from the client computing device a second selection of at least one second control methodology specific attribute for the at least one circuit breaker in the second zone from the setup interface; and storing a second zone data structure representing the second zone in the memory, the second zone data structure comprising one or more attributes comprising the second name for the second zone, the second designation for the second zone, the second selection of the at least one other circuit breaker, and the at least one second control methodology specific attribute for the at least one other circuit breaker.

41. The non-transitory computer-readable medium of claim 35, wherein the control request comprises a request to toggle a state of the at least one circuit breaker, the operations further comprising:

generating the request to toggle the state of the at least one circuit breaker; and visually representing the request to toggle the state of the at least one circuit breaker.

42. The non-transitory computer-readable medium of claim 35, wherein the control request comprises a request to toggle a state of the at least one circuit breaker, the operations further comprising:

generating the request to toggle the state of the at least one circuit breaker based on a sequence and a delay time; and visually representing the request to toggle the state of the at least one circuit breaker based on the sequence and the delay time.

43. The non-transitory computer-readable medium of claim 35, the operations further comprising:

receiving a supergroup grouping request to include the at least one circuit breaker in a supergroup, the supergroup comprising at least one of a brownout supergroup, an emergency lighting supergroup, and an emergency off supergroup; and adding the at least one circuit breaker to the supergroup.

44. The non-transitory computer-readable medium of claim 35, the operations further comprising:

receiving a request for realtime detailed power usage information associated with the at least one circuit breaker;

receiving a status of a device associated with the at least one circuit breaker formatted according to one of the first control methodology and the second control methodology;

interpreting the status of the device associated with the at least one circuit breaker formatted according to one of the first control methodology and the second control methodology; and transmitting a response to the request for realtime detailed power usage information associated with the device associated with the at least one circuit breaker.

45. The non-transitory computer-readable medium of claim 44, the operations further comprising visually representing the detailed power usage information associated with the device associated with the at least one circuit breaker using a graph.

46. The non-transitory computer-readable medium of claim 35, the operations further comprising:

receiving contact information for an administrator;

determining that a circuit breaker has entered an alarm state; and transmitting a message to the administrator based on the contact information, the message indicating that the circuit breaker has entered the alarm state.

47. The non-transitory computer-readable medium of claim 35, wherein the client computing device comprises at least one of a smartphone and a tablet.

48. The non-transitory computer-readable medium of claim 47, wherein the control request is transmitted to the system by the at least one of the smartphone and the tablet using hypertext transfer protocol (HTTP) by a mobile application.

49. The non-transitory computer-readable medium of claim 35, wherein the control request comprises an HTTP request.

50. The non-transitory computer-readable medium of claim 49, further comprising transmitting to the client computing device an HTTP response comprising a visual representation of a current status of the plurality of circuit breakers.

51. The non-transitory computer-readable medium of claim 50, wherein the current status of each of the plurality of circuit breakers comprises one of ON, OFF, TRIPPED, MANUAL ON, and FAILURE.

* * * * *